United States Patent
Kim et al.

(10) Patent No.: US 11,812,289 B2
(45) Date of Patent: Nov. 7, 2023

(54) METHOD FOR DEALING WITH NETWORK FAILURE

(71) Applicant: LG ELECTRONICS INC., Seoul (KR)

(72) Inventors: Hyunsook Kim, Seoul (KR); Sungduck Chun, Seoul (KR); Laeyoung Kim, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 17/599,672

(22) PCT Filed: Dec. 23, 2019

(86) PCT No.: PCT/KR2019/018287
§ 371 (c)(1),
(2) Date: Sep. 29, 2021

(87) PCT Pub. No.: WO2020/204310
PCT Pub. Date: Oct. 8, 2020

(65) Prior Publication Data
US 2022/0167185 A1    May 26, 2022

(30) Foreign Application Priority Data
Apr. 2, 2019 (KR) .................. 10-2019-0038413

(51) Int. Cl.
*H04W 8/02* (2009.01)
*H04W 24/04* (2009.01)
(Continued)

(52) U.S. Cl.
CPC .............. *H04W 24/04* (2013.01); *H04W 8/02* (2013.01); *H04W 48/04* (2013.01); *H04W 60/04* (2013.01); *H04W 88/06* (2013.01)

(58) Field of Classification Search
CPC ....... H04W 24/04; H04W 8/02; H04W 48/04; H04W 60/04; H04W 88/06; H04W 76/19;
(Continued)

(56) References Cited

U.S. PATENT DOCUMENTS

2012/0100848 A1    4/2012   Miklos
2015/0055447 A1*   2/2015   Jamadagni .............. H04W 4/70
                                                            370/216

FOREIGN PATENT DOCUMENTS

EP    3641423 A1   4/2020
EP    3937545 A1   1/2022
(Continued)

OTHER PUBLICATIONS

3GPP TS 23.401 V16.0.0.
(Continued)

*Primary Examiner* — Huy C Ho
(74) *Attorney, Agent, or Firm* — BRYAN CAVE LEIGHTON PAISNER LLP

(57) ABSTRACT

A disclosure of the present specification provides a method performed by a network node that manages mobility in a first public land mobile network (PLMN). The network node may receive an access request message of a terminal from a base station in the first PLMN. The terminal may be a terminal having joined a second PLMN. On the basis of occurrence of a failure in the second PLMN, the network node may determine whether to allow the terminal to roam to the first PLMN.

16 Claims, 32 Drawing Sheets

(51) Int. Cl.
    *H04W 48/04* (2009.01)
    *H04W 60/04* (2009.01)
    *H04W 88/06* (2009.01)
(58) Field of Classification Search
    CPC ....... H04W 8/12; H04W 48/18; H04W 76/50;
                                              H04W 60/005
    USPC ...................................... 455/432.1
    See application file for complete search history.

(56) References Cited

FOREIGN PATENT DOCUMENTS

| KR | 10-2012-0111905 | 10/2012 |
|----|-----------------|---------|
| KR | 10-2014-0097324 | 8/2014 |
| KR | 10-2018-0101439 | 9/2018 |
| WO | 2018029567 | 2/2018 |
| WO | 2018231029 A1 | 12/2018 |

OTHER PUBLICATIONS

3GPP TS 23.402 V16.0.0.
"3rd Generation Partnership Project; Technical Specification Group Services and System Aspects; Study on Application-Specific Congestion Control for Data Communication (Release 13)", 3GPP TR 22.806 V.13.1.0 (Sep. 26, 2014), XP051293662.

* cited by examiner

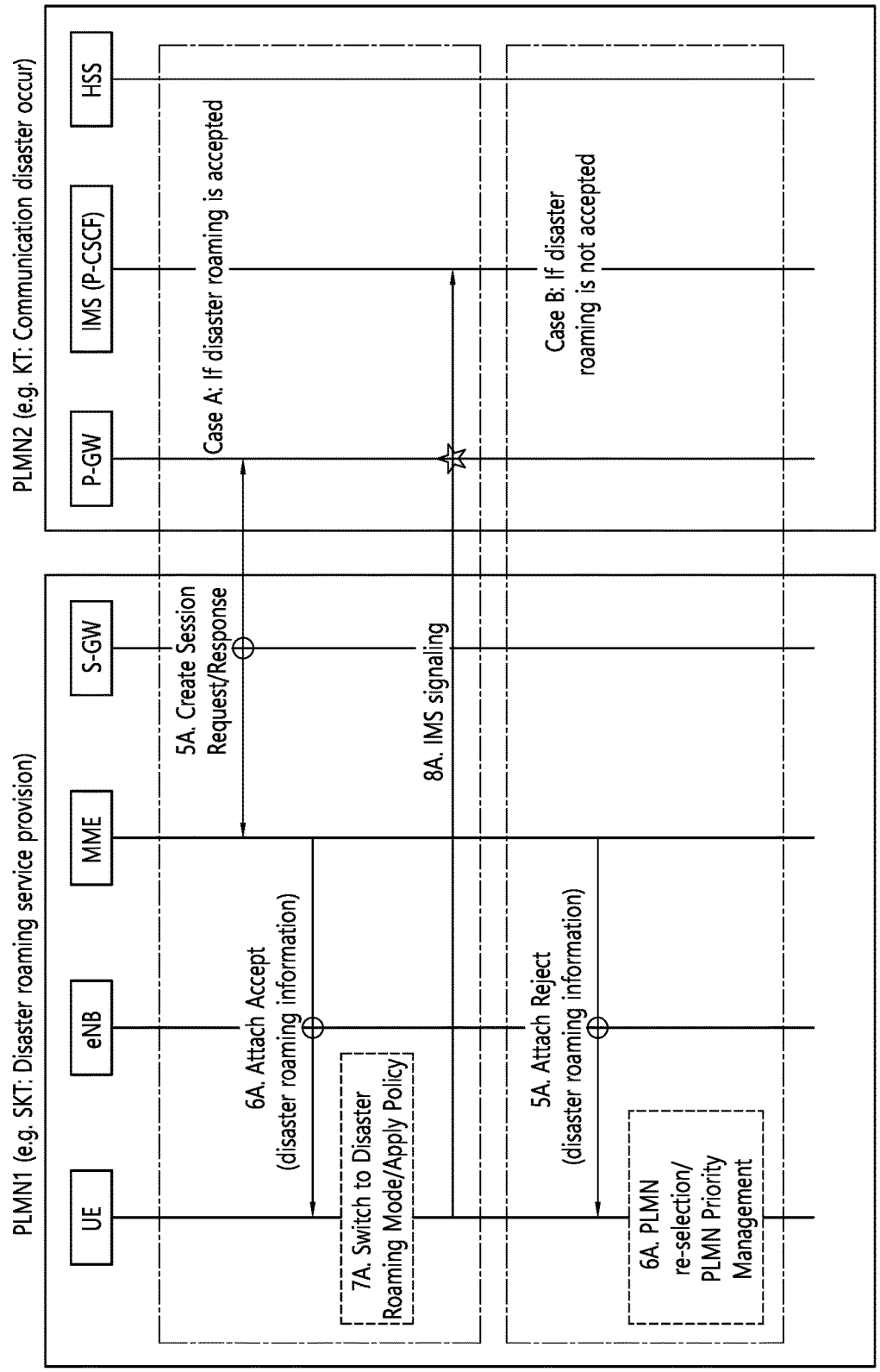

METHOD FOR DEALING WITH NETWORK FAILURE

This application is the National Stage filing under 35 U.S.C. 371 of International Application No. PCT/KR2019/018287 filed on Dec. 23, 2019, which claims priority to Korean Patent Application No. 10-2019-0038413 filed on Apr. 2, 2019, the contents of which are all hereby incorporated by reference herein in their entirety.

TECHNICAL FIELD

The present specification relates to mobile communication.

BACKGROUND

SAE (System Architecture Evolution) that has been performed based on 3GPP ($3^{rd}$ Generation Partnership Project) SA (Service and System Aspects) WG2 (working group 2) is research regarding network technology that aims to determine the structure of a network and to support mobility between heterogeneous networks in line with an LTE task of a 3GPP TSG (Technical Specification Group) RAN (radio access network) and is one of recent important standardization issues of 3GPP. SAE is a task for developing a 3GPP system into a system that supports various radio access technologies based on an IP (internet protocol), and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control |

TABLE 1-continued

| REFERENCE POINT | DESCRIPTION |
|---|---|
| | and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG. FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode™, an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

<Network Failure>

On the other hand, a failure may occur in the base station of the first public land mobile network (PLMN) by the first operator, and a situation may occur in which a mobile communication service cannot be provided any longer through the corresponding base station.

A simple failure can be restored within a short period of time, but when a failure occurs due to fire, flooding, etc., it may not be restored for hours or days. In this case, user may take inconvenience for simple communication, but interruption of important communication (eg, emergency call (119 or 911 call) or corporate VPN communication) may cause a major problem.

Therefore, when a failure occurs in the first PLMN by the first operator, there is a need for a method in which a subscriber of the first operator can be provided with a communication service. For example, when a failure occurs in the first PLMN by the first operator, another second operator may provide a service for the subscribers of the first operator on behalf of the first operator.

However, there is a problem that a technical method for this has not been proposed so far.

SUMMARY

Accordingly, one disclosure of this specification is to propose a scheme capable of solving the aforementioned problems.

In order to achieve the above object, one disclosure of the present specification provides a method performed by a network node for managing mobility in a first public land mobile network (PLMN). The network node may receive the access request message of the terminal from the base station in the first PLMN. The terminal may be a terminal subscribed to the second PLMN. Based on the failure of the second PLMN, the network node may determine whether to allow the terminal to roam to the first PLMN.

In order to achieve the above object, one disclosure of the present specification provides a network node that manages mobility in a first public land mobile network (PLMN). The network node includes a transceiver; and a processor controlling the transceiver. the processor controls the transceiver to receive an access request message of a terminal from a base station in the first PLMN, and the terminal is a terminal subscribed to a second PLMN; determining whether to allow the terminal to roam to the first PLMN based on the failure of the second PLMN; and transmitting a response message to the access request message to the terminal through the base station in the first PLMN based on the determination, and the response message may include information notifying that a failure has occurred in the second PLMN.

BRIEF DESCRIPTION OF THE DRAWINGS

FIGS. 15A and 15B show an embodiment in which a first example of the disclosure of the present specification is applied to an EPS.

DESCRIPTION OF EXEMPLARY EMBODIMENTS

Figure 1:
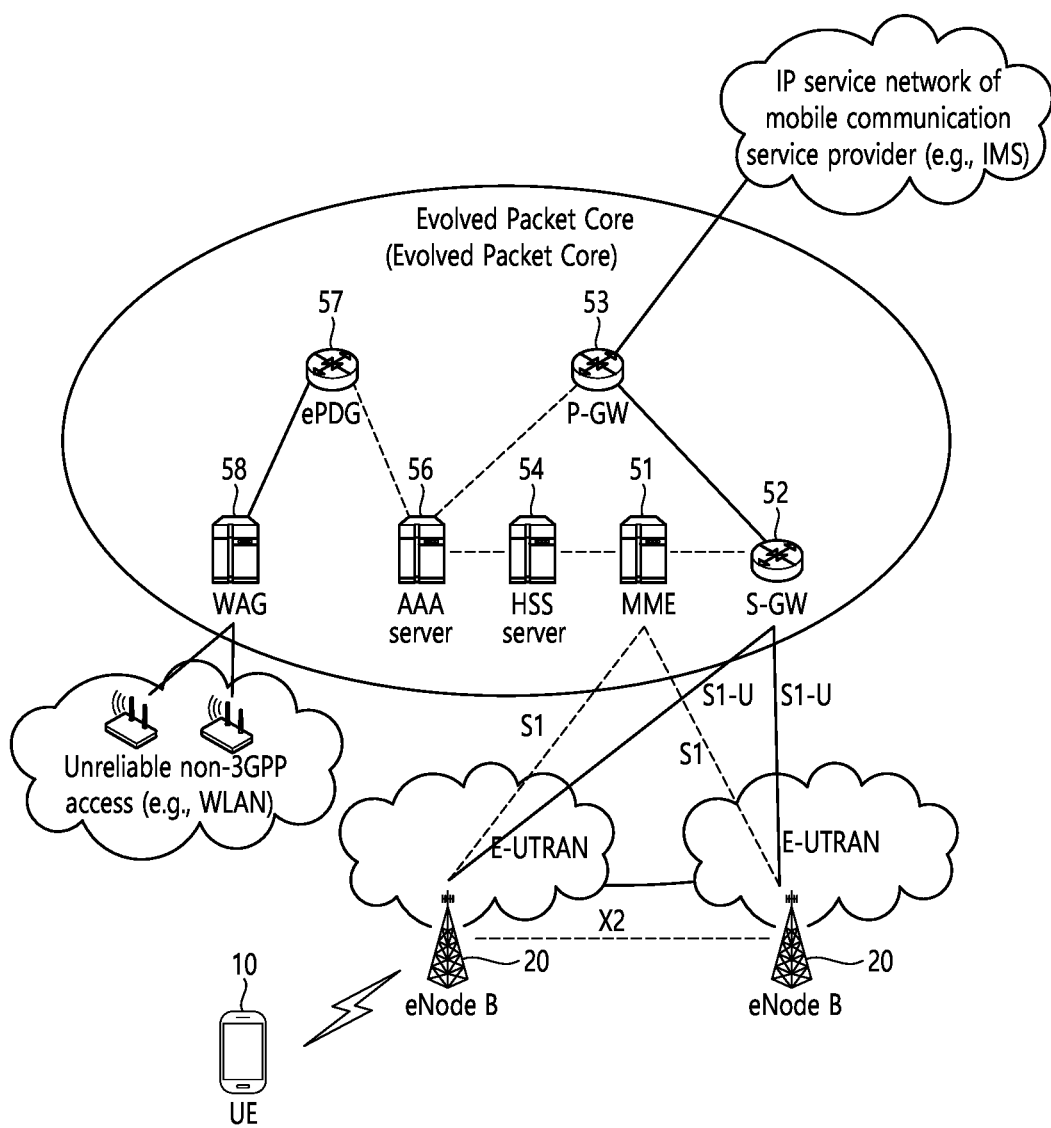
FIG. 1 shows the configuration of an evolved mobile communication network.
Figure 2:
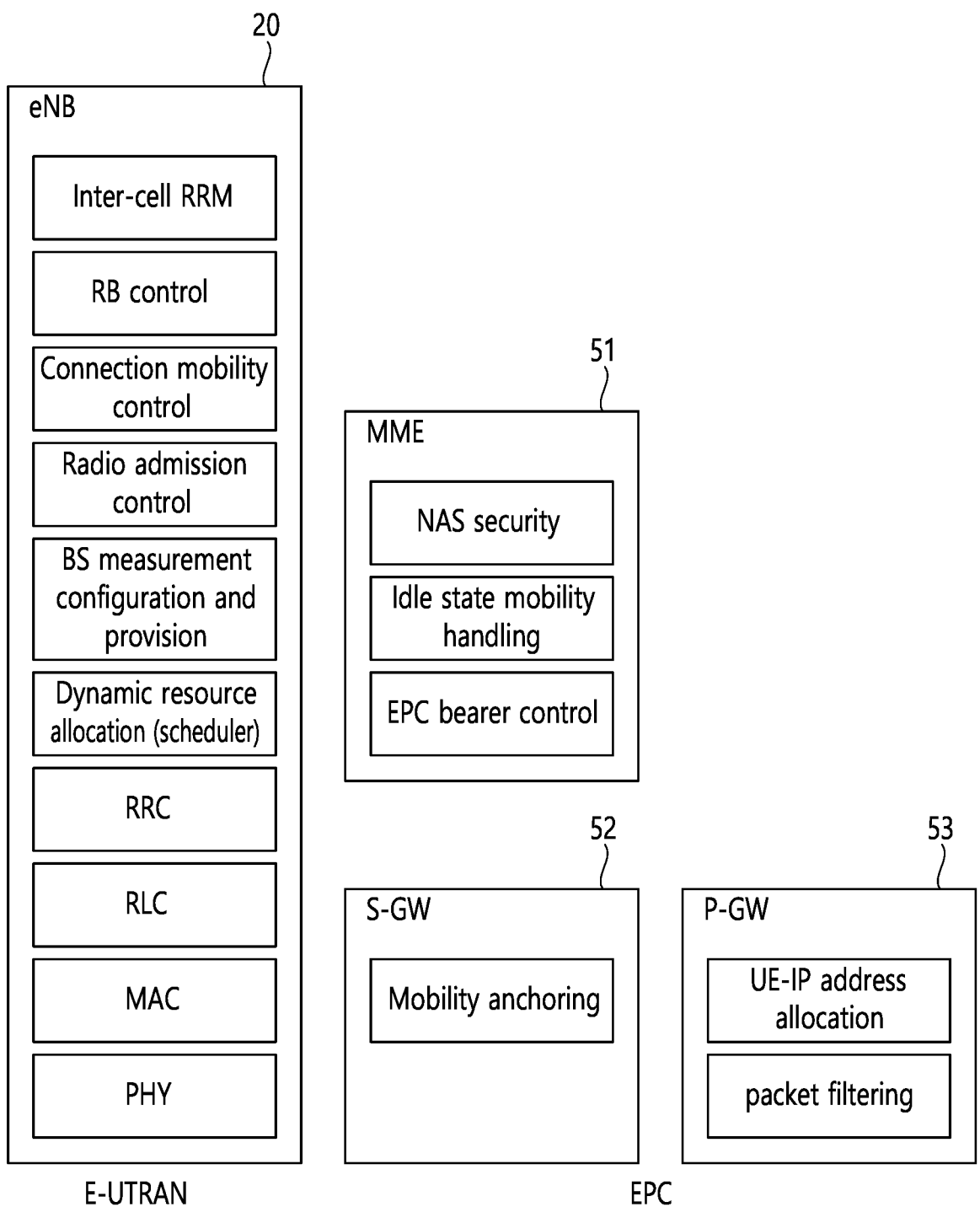
FIG. 2 is an exemplary diagram showing the architecture of a common E-UTRAN and a common EPC.
Figure 3:
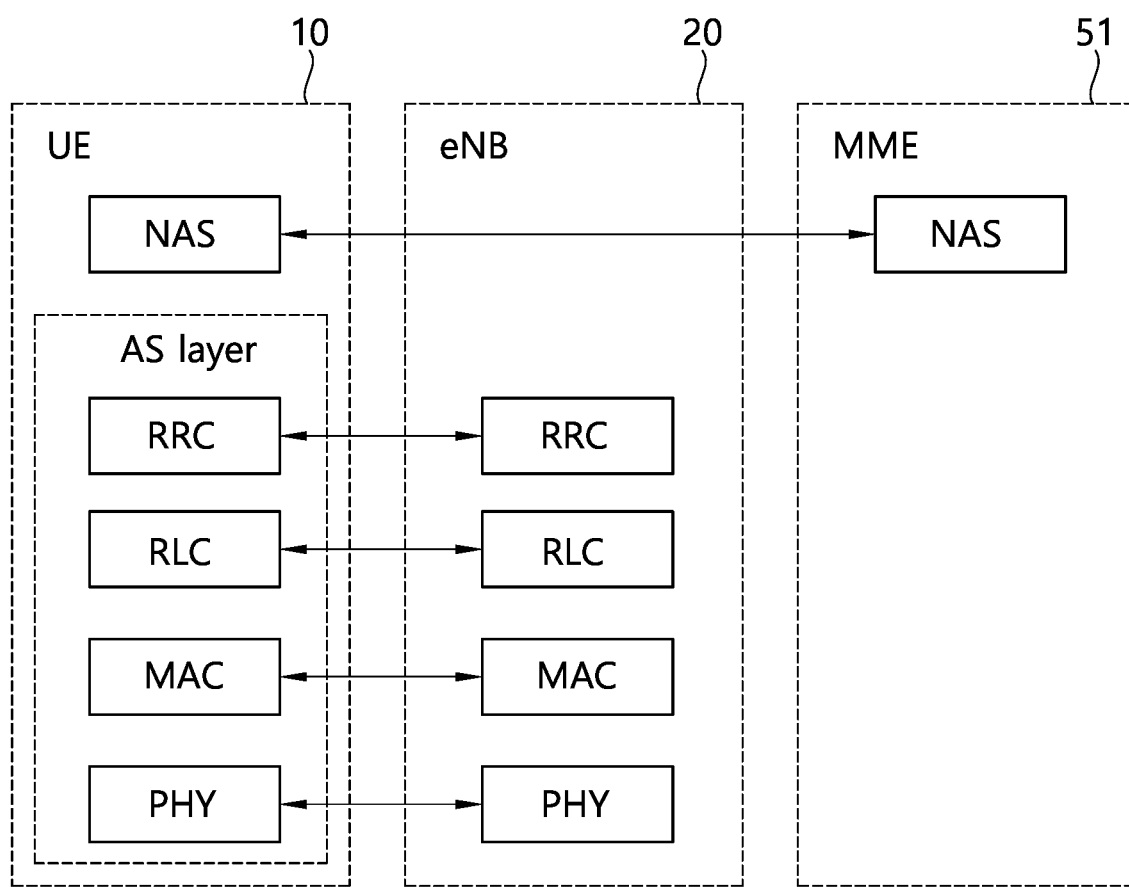
FIG. 3 is an exemplary diagram showing the structure of a radio interface protocol in a control plane between UE and an eNodeB.
Figure 4:
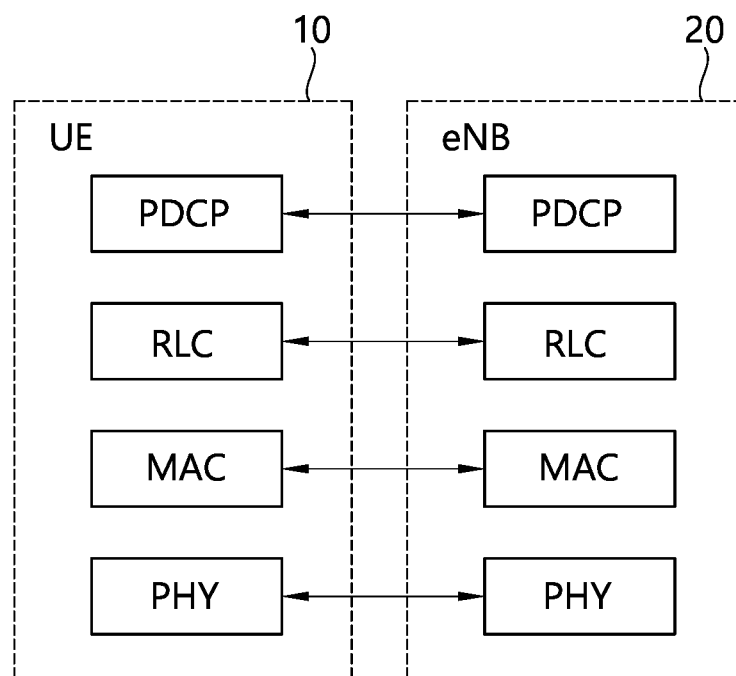
FIG. 4 is another exemplary diagram showing the structure of a radio interface protocol in a control plane between UE and an eNodeB.
Figure 5A:
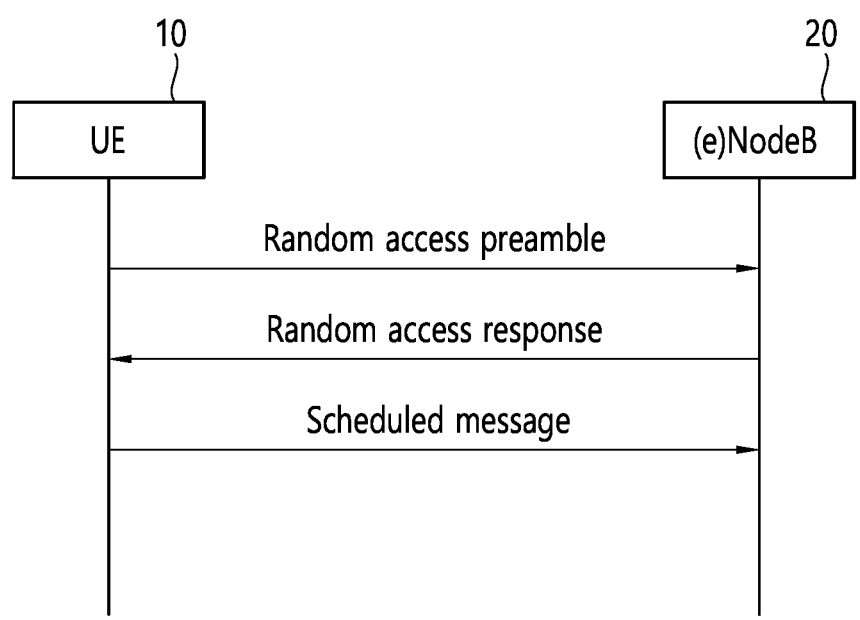
FIG. 5a is a flowchart illustrating a random access process in 3GPP LTE.
Figure 5B:
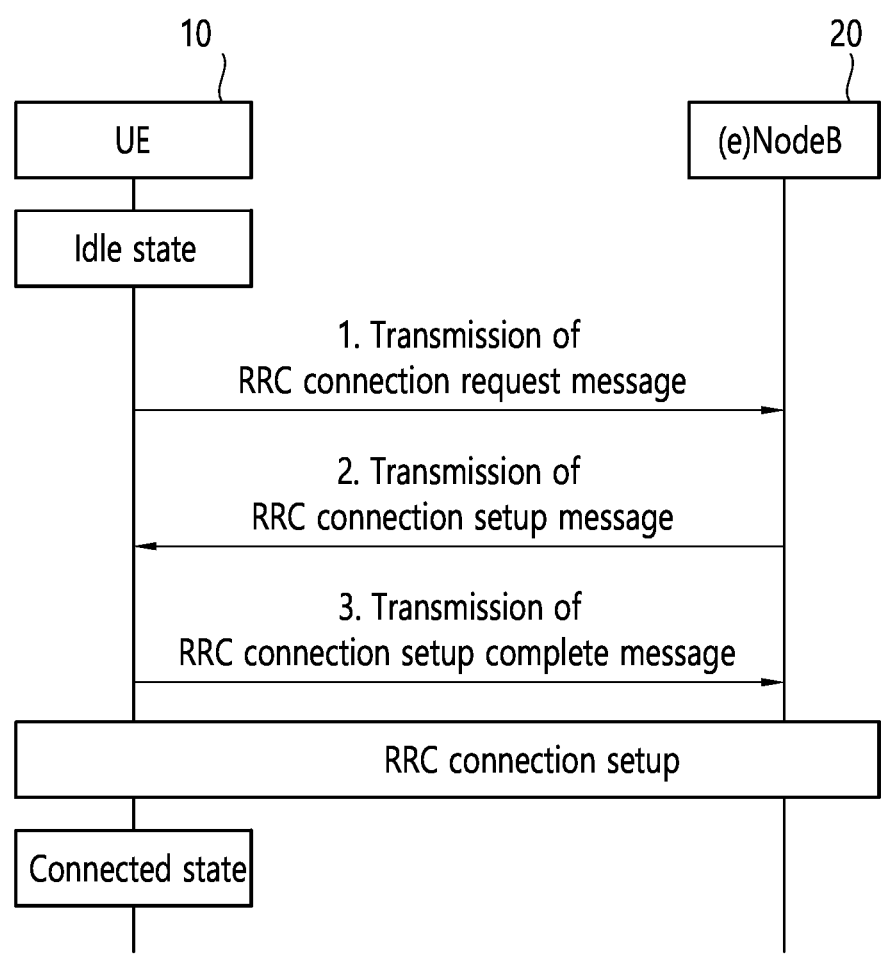
FIG. 5b illustrates a connection process in a radio resource control (RRC) layer.

The technical terms used herein are used to merely describe specific embodiments and should not be construed as limiting the presented specification. Further, the technical terms used herein should be, unless defined otherwise, interpreted as having meanings generally understood by those skilled in the art but not too broadly or too narrowly. Further, the technical terms used herein, which are determined not to exactly represented the spirit of the specification, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented specification.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented specification will be described in greater detail with reference to the accompanying drawings. In describing the presented specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

A base station, a term used below, generally refers to a fixed station that communicates with a wireless device, and an evolved-NodeB (eNodeB), an evolved-NodeB (eNB), a Base Transceiver System (BTS), and an access point (Access Point), may be called other terms such as gNB (Next generation NodeB).

And hereinafter, the term UE (User Equipment) used may be fixed or mobile, and may include a device, a wireless device, a wireless communication device, a terminal, and an MS (mobile station), a user terminal (UT), a subscriber station (SS), and a mobile terminal (MT).

In addition, the UE may be a portable device such as a notebook computer, a mobile phone, a PDA, a smart phone, a multimedia device, or the like, or may be a non-portable device such as a PC or a vehicle-mounted device.

Definition of Terms

For better understanding, the terms used herein are briefly defined before going to the detailed description of the specification with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e) NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

Each of embodiments proposed herein may be implemented solely, but the embodiments may be implemented in combination.

Figure 6:
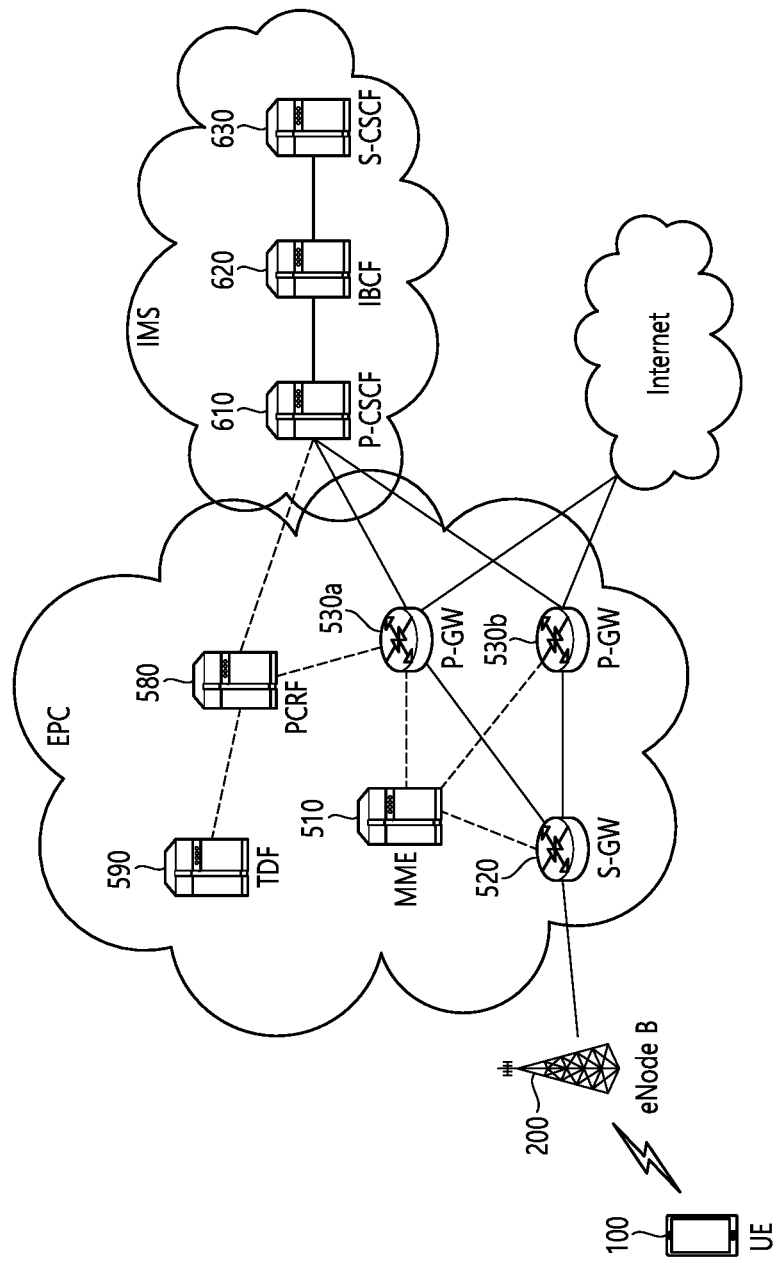
FIG. 6 shows a connection between an EPC and an IP Multimedia Subsystem (IMS).

FIG. 6 shows a connection between an EPC and an IP Multimedia Subsystem (IMS).

Refer to FIG. 6, in the EPC, the MME 510, the S-GW 520, the P-GW 530*a* connected to the IMS, the P-GW 530*b* connected to the Internet, and A Policy and Charging Rule Function (PCRF) 580 connected to the P-GW 530*b* and a traffic detection function (TDF) 590 connected to the PCRF 580 are shown.

The TDF 590 detects the application and reports the detected application and description information about the service data flow of the application to the PCRF 580. The TDF 590 supports solicited application reporting and/or unsolicited application reporting.

IMS is a network technology that enables packet switching (PS: Packet Switching) based on IP (Internet Protocol) to not only wired terminals but also wireless terminals, and has been proposed to connect both the wired terminals and wireless terminals via (All-IP).

The IMS-based network includes CSCF (Call Session Control Function) and IBCF (Interconnection Border Control Functions) 620 for handling control signaling, registration, and session procedures. The CSCF may include a Proxy-CSCF (P-CSCF) 61 and a Serving-CSCF (S-CSCF) 630. In addition, the CSCF may include an Interrogating-CSCF (I-CSCF). The P-CSCF 610 operates as a first access point for user equipment (UE) in an IMS-based network. Then, the S-CSCF 630 processes a session in the IMS network. That is, the S-SCSF 630 is an entity responsible for routing signaling and routes a session in the IMS network. And, the I-CSCF operates as an access point with other entities in the IMS network.

Under the above IMS, an IP-based session is controlled by a session initiation protocol (SIP). The SIP is a protocol for controlling a session, the SIP is a protocol indicating a procedure for terminals wanting to communicate to identify each other and find their location, create a multimedia service session between them, or delete and change the created session. The SIP uses a SIP Uniform Resource Identifier (URI) similar to an e-mail address to distinguish each user, so that a service can be provided without being dependent on an IP (Internet Protocol) address. These SIP messages are control messages, but are transmitted between the UE and the IMS network through the EPC user plane.

Referring to FIG. 6, the first P-GW 530a of the EPC is connected to the P-CSCF 610 of the IMS, the P-CSCF 610 is connected to the IBCF 620, and the IBCF 620 is connected to the S-CSCF (630).

In addition, the second P-GW 530b of the EPC is connected to the network of the Internet service provider.

Figure 7:
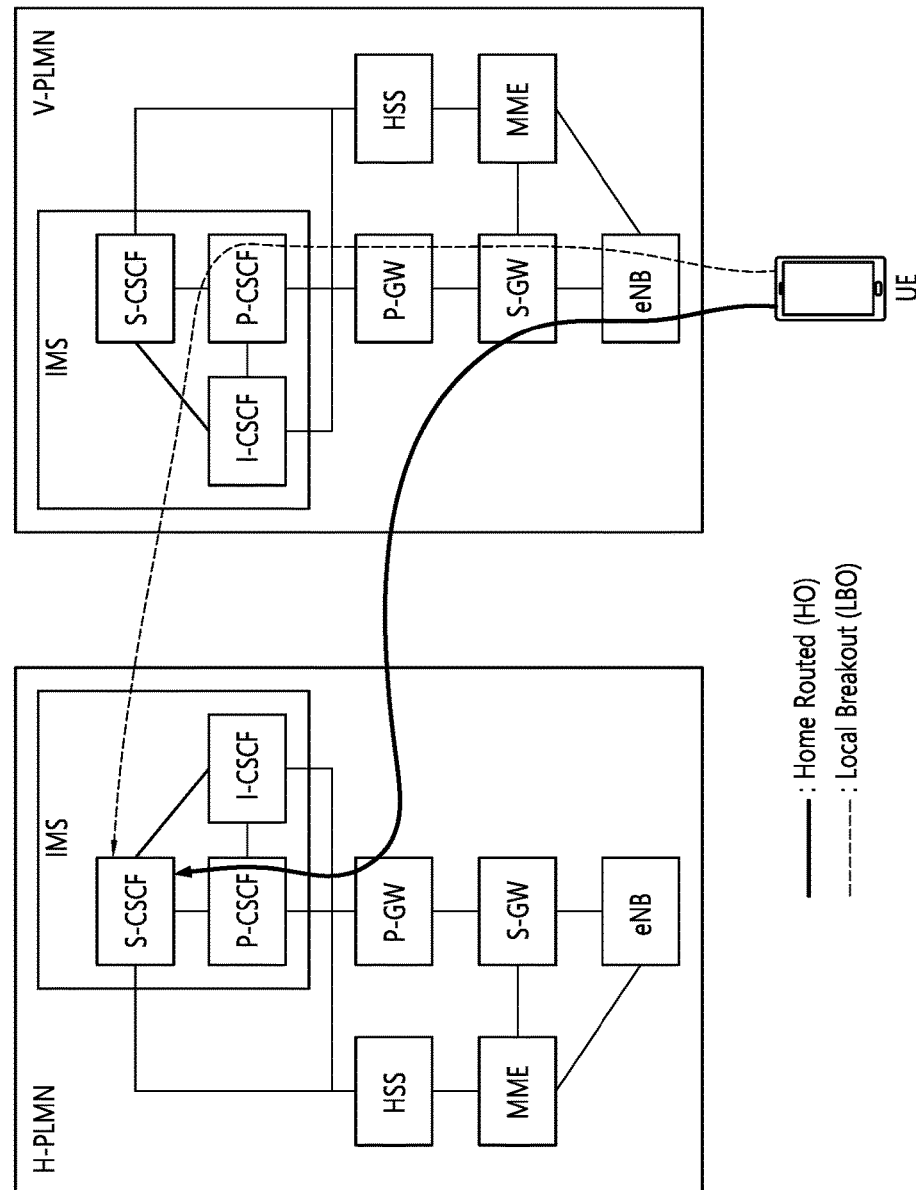
FIG. 7 illustrates a voice over LTE (VoLTE) roaming architecture.

FIG. 7 illustrates a voice over LTE (VoLTE) roaming architecture.

As illustrated in FIG. 7, the VoLTE roaming architecture includes a home routed (HR) architecture and a local breakout (LBO) architecture.

According to the LBO architecture, an IMS signal transmitted from a UE is transmitted to an S-CSCF in a home public land mobile network (H-PLMN) via an S-GW/P-GW/P-CSCF in a visited PLMN (V-PLMN).

In the HR architecture, the IMS signal is transmitted to the S-CSCF via the S-GW in the V-PLMN and a P-GW/P-CSCF in the H-PLMN.

Figure 8:
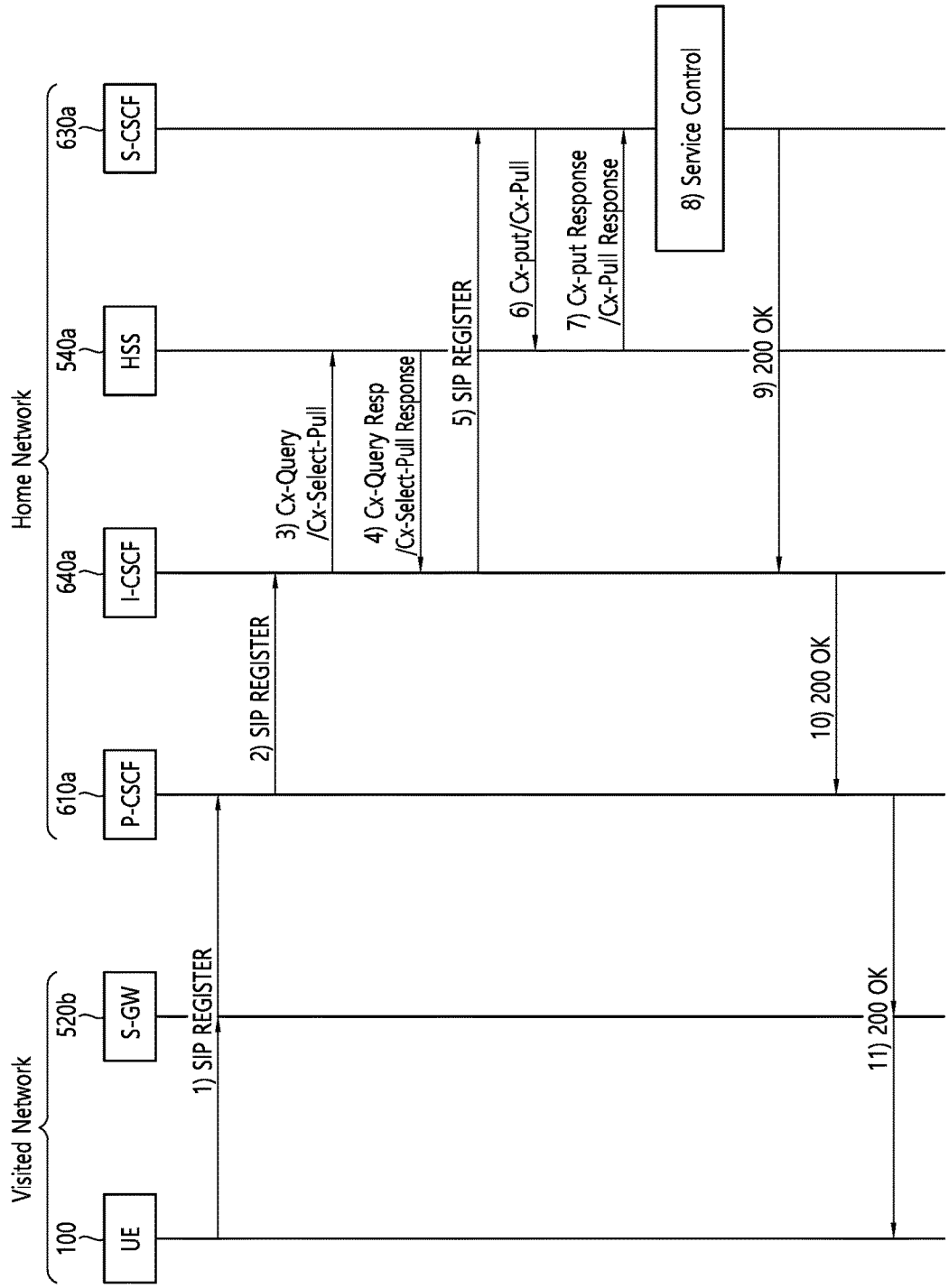
FIG. 8 is an exemplary signal flow diagram illustrating a process of performing IMS registration in a HR (Home Routed) manner in a situation in which the UE roams to a visited network.

FIG. 8 is an exemplary signal flow diagram illustrating a process of performing IMS registration in a HR (Home Routed) manner in a situation in which the UE roams to a visited network.

As can be seen with reference to FIG. 8, the UE 100 is in a roaming state in the visited network.

First, the UE 100 located in the visited network generates an IMS PDN with P-GW in the home network through the S-GW 520b in the visited network. Here, the IMS PDN may be a PDN for an IMS service, a PDN of a well-known IMS APN, a PDN for a Voice over LTE service, or the like.

1) Next, when the UE 100 transmits a SIP-based REGISTER message to the S-GW 520b in the visited network to perform IMS registration, the S-GW 520b in the visited network transmits the message to the P-CSCF 610a in the home network.

2) The P-CSCF 610a forwards the message to the I-CSCF 640a.

3) to 4) The I-CSCF 640a obtains user information from the HSS 540a in the home network.

5) Next, the I-CSCF 640a transmits the SIP-based REGISTER message to the S-CSCF 630a.

6) to 7) The S-CSCF 630a obtains user information from the HSS.

8) Subsequently, the S-CSCF 630a performs service control for registration of the UE.

9) to 11) If the registration of the UE is successful, the S-CSCF 630a transmits a 200 OK message.

<Next Generation Mobile Communication System Architecture>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU proposes three usage scenarios, for example, enhanced Mobile BroadBand (eMBB), massive Machine Type Communication (mMTC) and Ultra Reliable and Low Latency Communications (URLLC).

First, URLLC relates to usage scenarios requiring high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1 ms.

Next, the eMBB usage scenario relates to a usage scenario requiring mobile ultra-wideband.

This ultra-wideband high-speed service seems difficult to be accommodated by the core network designed for the existing LTE/LTE-A.

Therefore, in the so-called 5G mobile communication, redesign of the core network is urgently required.

Figure 9:
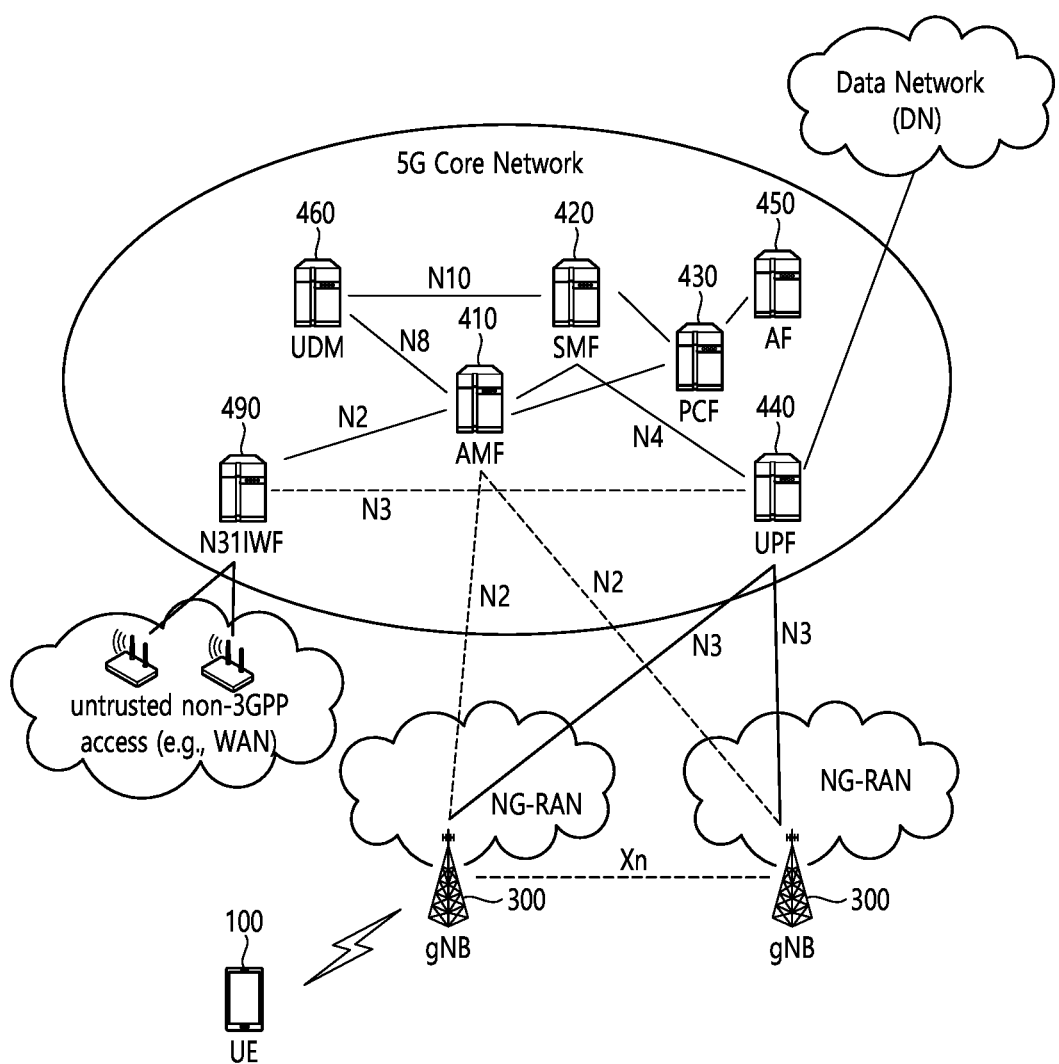
FIG. 9 is a structural diagram of a next-generation mobile communication network.

FIG. 9 is a structural diagram of a next-generation mobile communication network.

5GC (5G Core) may include various components, part of which are shown in FIG. 9, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

Figure 10:
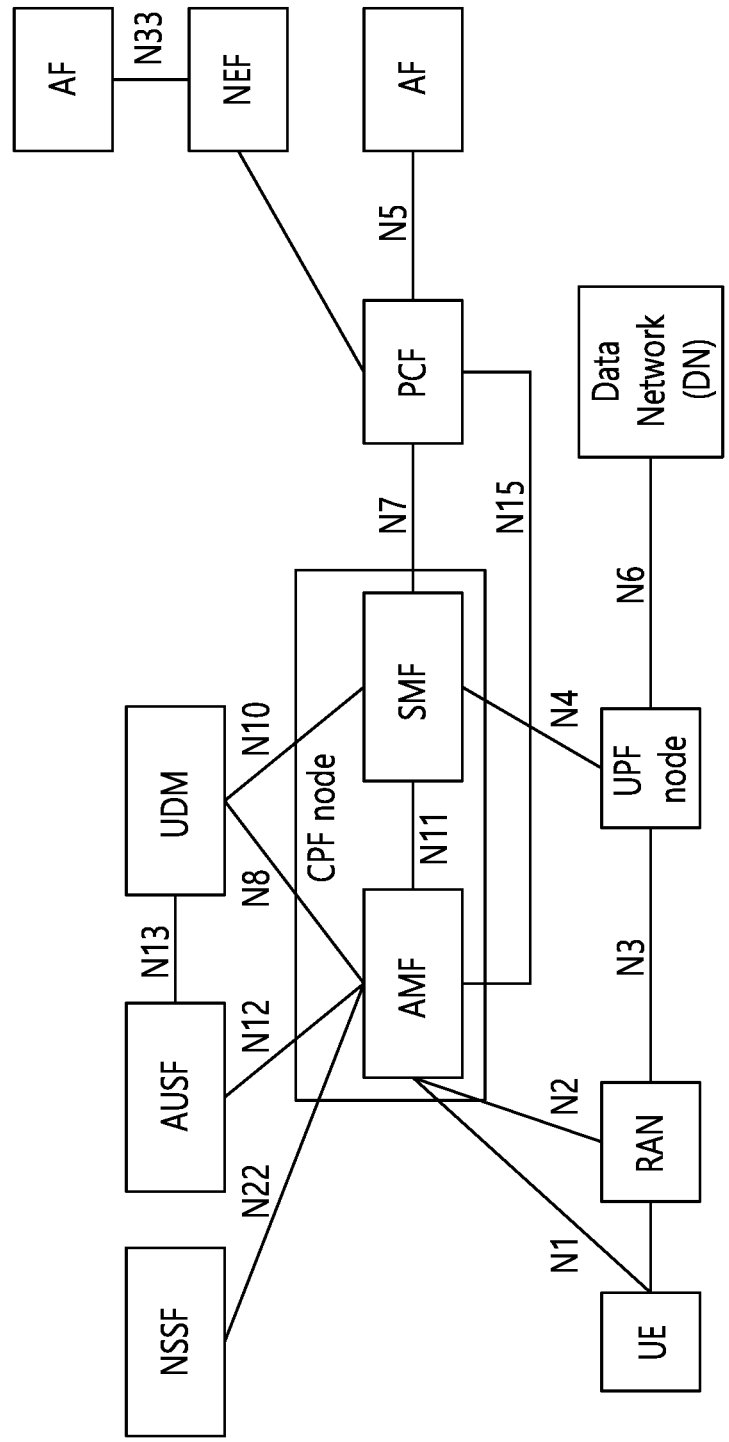
FIG. 10 is an exemplary diagram illustrating a predicted structure of a next generation mobile communication in terms of a node.

FIG. 10 is an exemplary diagram illustrating a predicted structure of a next generation mobile communication in terms of a node.

Referring to FIG. 10, the UE is connected to a data network (DN) through a next generation RAN (Radio Access Network).

The Control Plane Function (CPF) node shown in FIG. 10 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 10 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 10, UE may access to 2 data networks by using multiple PDU (Protocol Data Unit) session.

Figure 11:
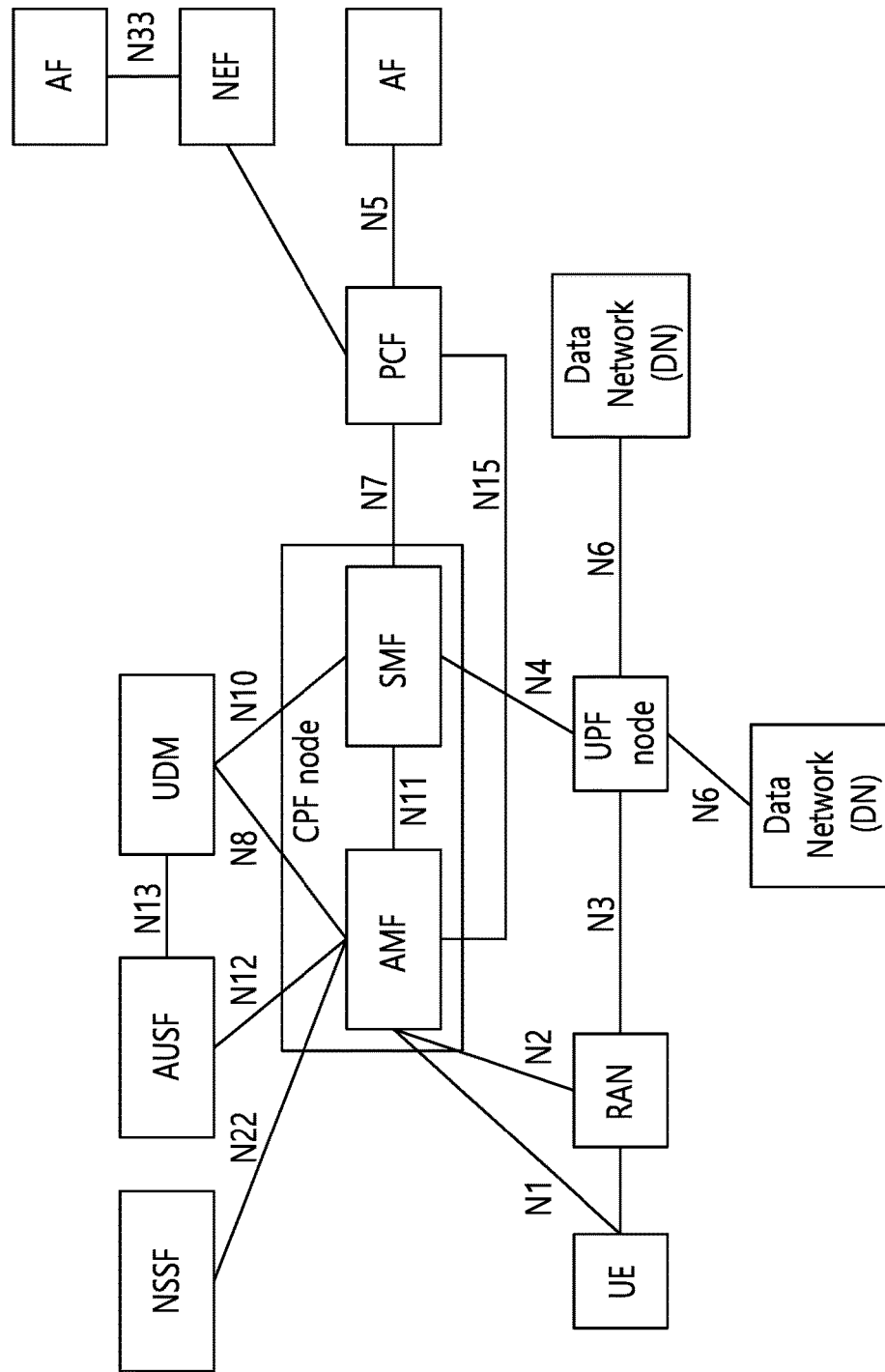
FIG. 11 illustrates an architecture that allows the UE to simultaneously access two data networks using one PDU session.

FIG. 11 illustrates an architecture that allows the UE to simultaneously access two data networks using one PDU session.

FIG. 11 illustrates an architecture that allows the UE to simultaneously access two data networks using one PDU session.

Figure 12:
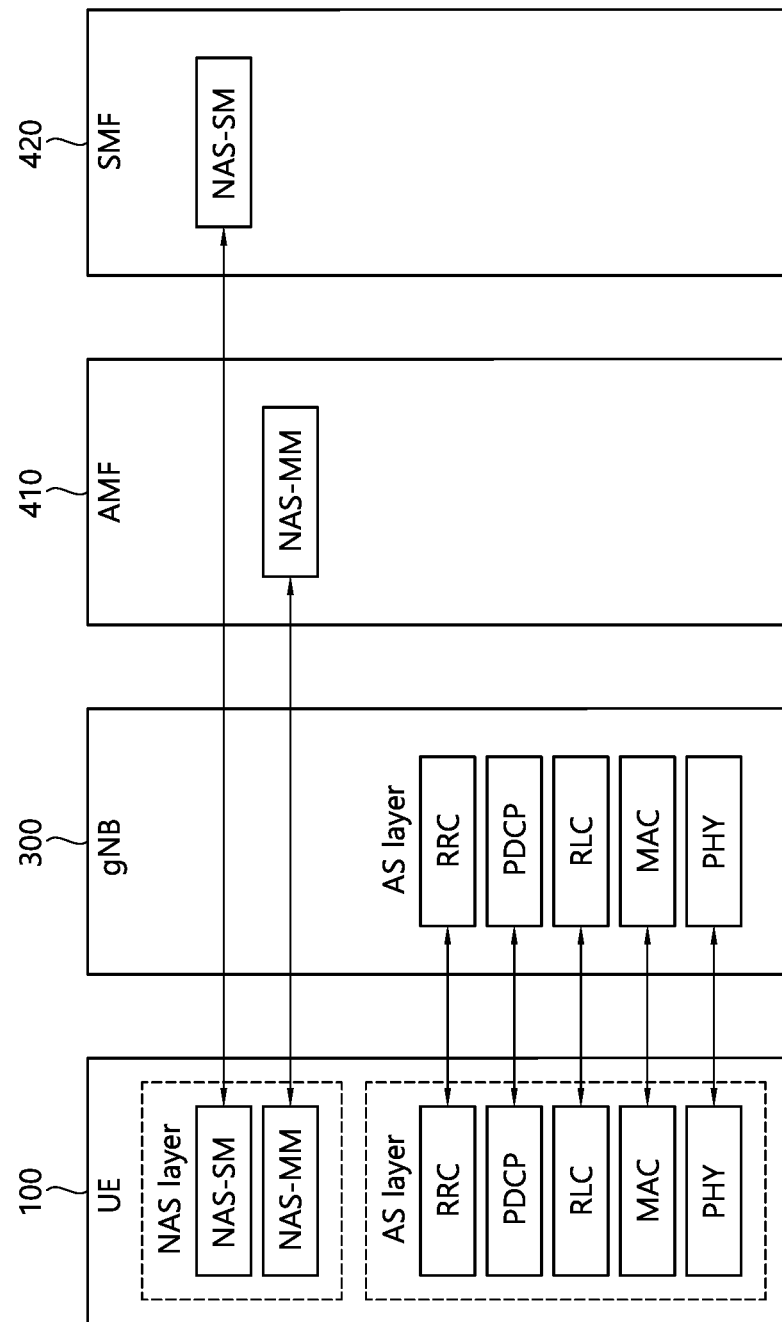
FIG. 12 is another exemplary diagram showing a structure of a radio interface protocol between a UE and a gNB.

FIG. 12 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Meanwhile, in FIG. 12, the RRC layer, the RLC layer, the MAC layer, and the PHY layer located below the NAS layer are collectively referred to as an access stratum (AS).

Problems to be Solved by the Disclosure of this Specification

In the present specification, a situation in which a mobile communication service can no longer be provided through the base station due to a failure in the base station of the second PLMN by the second operator is described. Until the physical recovery of the corresponding base station is made, it is assumed that the base station of the first PLMN by the first operator broadcasts the SIB message temporarily (for example, hours or days, etc.) by including information on the second PLMN by a third party (other compnay) (ie, the second operator) in order to provide a service on behalf of the second operator in the corresponding failure area.

In this case, the third party (other company) subscription terminal (ie, the terminal subscribed to the second PLMN) that has received the broadcast information accesses the network in the same way as when accessing the HPLMN (ie, the second PLMN), whereas from the network point of view, the same shape as the network serving the roaming terminal is made. That is, from a network point of view, in order to cope with a failure occurring in the second PLMN of the second operator, the network node of the first PLMN (eg, VPLMN) of the first operator may perform connection to the network node of the second PLMN (eg, HPLMN), and thus a route such as HR (Home Routed) roaming can be used. This may cause the following problems.

Accordingly, if an appropriate operation of the network (the first PLMN) is not performed, the utilization of network resources such as signaling waste and the user's service experience may be lowered. For example, since the terminal does not recognize the roaming situation, it may not understand the charging policy or the restrictions in the roaming situation, and may transmit various requests (requests that the network is likely to reject) to the network. For this reason, even if the network rejects the request transmitted by the terminal to control communication with the terminal roaming in the network, utilization of network resources such as signaling waste and the user's service experience may be lowered.

Disclosure of the Present Specification

The disclosure of the present specification may be implemented by a combination of one or more of the following configurations. In the case of the embodiment below, an embodiment is shown to show each individual configuration, but an embodiment in which one or more combinations are configured together may be implemented.

Hereinafter, an embodiment based on EPS and 5GS (5G System) will be described, but the content disclosed by this specification is also applicable to an embodiment implemented in 5GS.

In this specification, a special roaming situation mode of the terminal is defined. (ie, not a normal roaming situation, but a roaming situation that operates to overcome the failure situation as described above). For ease of description in the present specification, general roaming will be referred to as N-roaming, and roaming operating to overcome the failure situation will be referred to as S-roaming.

As described in the above problem, if the terminal does not understand the S-roaming (ie, roaming operated to overcome a failure situation. Hereinafter also referred to as disaster roaming), the terminal recognizes it as a non-roaming situation and operates. If the terminal recognizes the S-roaming situation through the contents described in the disclosure of this specification, the terminal may operate in the S-roaming mode preset by the operator. The terminal may recognize that it is operating in the S-roaming mode.

The operator's settings may be pre-configured or transmitted to the terminal through an Open Mobile Alliance (OMA)-DM (Device Management) method or a policy transmission method. The setting of the operator may be updated as necessary.

For example, the operator (eg, the first operator of the first PLMN) allows the request for voice and SMS of the inbound roaming terminal (the terminal subscribed to the second PLMN) in the S-roaming situation, but the operator (eg, the first operator of the first PLMN) may set data Service requests be limited. In addition, the operator may set the priority of random access by a specific application of the inbound roaming terminal differently from the general situation. Alternatively, for the purpose of adjusting the signal load, the operator may change the period of the P-TAU (periodic tracking area update) of the terminal, or may set the non-essential request during the operation of the terminal to be delayed.

For reference, a failure occurring in the second PLMN may be referred to as a communication disaster. A disaster is damage to human life or property due to a change in natural phenomena such as weather or man-made accidents. A telecommunication disaster means a failure of a specific telecommunication company caused by a disaster. In the present specification, disaster (or communication disaster) and failure (or network failure) are used as words having the same meaning.

When a failure occurs in the second PLMN of the disaster operator (ie, the second operator), the first PLMN of the roaming operator (ie, the first operator) may accommodate the subscribers of the disaster operator. In this case, the roaming service provider may selectively accommodate subscribers of the disaster service provider using a specific frequency band. Here, the specific frequency band may be a frequency band used in the second PLMN of the disaster operator.

For example, the base station in the first PLMN of the roaming operator may broadcast the roaming operator PLMN identifier (the first PLMN identifier) and the disaster operator PLMN identifier (the second PLMN identifier) together using the SIB message in a specific frequency band. For reference, the first operator may provide information related to the failure occurring in the second PLMN of the second operator to the base station in the first PLMN. For example, the first operator may notify the base station in the first PLMN of information related to a failure occurring in the second PLMN by an OAM (Operations, Administration and Maintenance) method. In addition, the base station in the first PLMN may broadcast only the roaming operator PLMN identifier in a frequency band other than a specific frequency band. Then, the subscriber terminal of the disaster service provider may be provided with a communication service through the base station in the first PLMN by tuning to a specific frequency band of the base station in the first PLMN through cell search.

Figure 13:
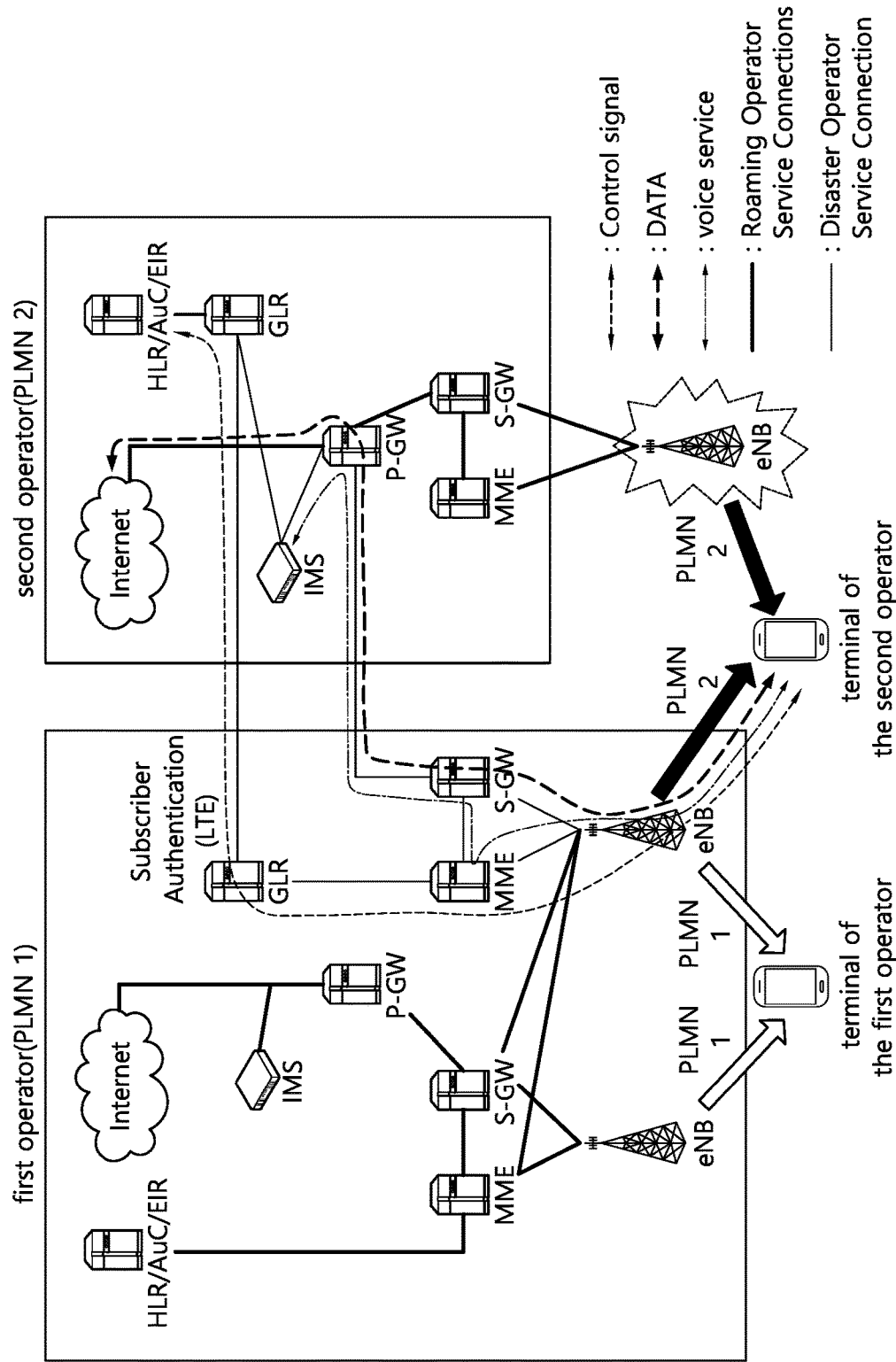
FIG. 13 shows an example of an EPS network structure related to the disclosure of the present specification.
Figure 14:
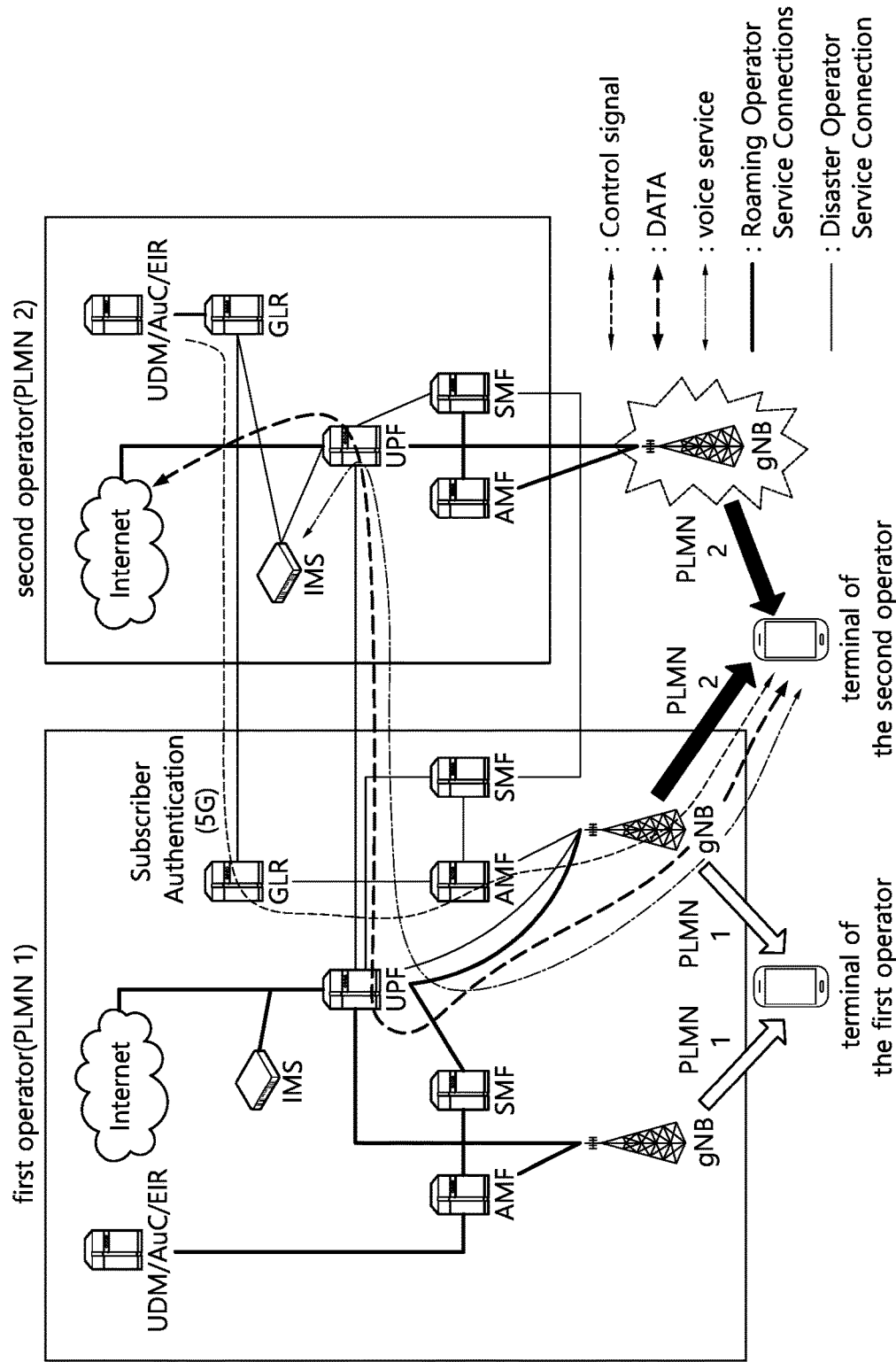
FIG. 14 shows an example of an EPS network structure related to the disclosure of the present specification.

FIGS. 13 and 14 are examples of a network structure in which a subscriber of the second PLMN having a failure is provided with a service through a base station in the first PLMN according to the disclosure of the present specification.

In FIGS. 13 and 14, EIR is an Equipment Identity Register. The EIR may be a database that manages the identity information of the terminal. The identity information may be, for example, International Mobile Equipment Identity (IMEI).

HLR is the Home Location Register. The HLR may be a database storing information of users who have subscribed to a mobile communication network (a first PLMN or a second PLMN). User information is stored in the SIM and transmitted to the mobile communication network through the network, and the HLR may store and manage data for authenticating the transmitted information. For example, the HLR may store and manage a key value required for authentication, including an International Mobile Subscriber Identity (IMSI), which is a unique identification number for a user.

AuC is the Authentication Center. AuC can authenticate the user by using the key value for user authentication stored in the HLR. The AuC may determine whether the user is a suitable user who can use the corresponding mobile communication network.

GLR is the Gateway Location Register. The GLR may serve as a gateway when exchanging information of a roaming terminal between a home network (eg, a second PLMN) and a visited network (eg, a first PLMN) when the terminal roams. The information of the roaming terminal may be, for example, subscriber location information or a profile.

For reference, in FIGS. 13 to 20B, PLMN 1 (eg, a PLMN of a telecommunication operator SKT (SK Telecom, Korea)) means a first PLMN. The first PLMN may be a PLMN that provides a disaster roaming service. PLMN 2 (eg, PLMN of telecommunication operator KT (KT corporation in Korea)) means the second PLMN. The second PLMN is a PLMN in which a network failure (communication disaster) has occurred.

FIGS. 13 and 14 assume that a failure (disaster) occurs in the second PLMN (PLMN 2). When a failure occurs in the second PLMN, the base station of the first PLMN (PLMN 1) may broadcast the SIB message including information on the second PLMN. Then, the terminal subscribed to the second PLMN may be provided with a service through the base station in the first PLMN.

FIG. 13 shows an example of an EPS network structure related to the disclosure of the present specification.

Referring to FIG. 13, when a failure occurs in a base station (eNB) in the second PLMN, a terminal subscribed to the second PLMN cannot receive a service through the base station in the second PLMN. When the first PLMN recognizes that a failure has occurred in the second PLMN, the base station (eNB) in the first PLMN may broadcast the SIB message including information on the second PLMN. Then, the terminal subscribed to the second PLMN (the second operator subscription terminal) may be provided with a service through the base station in the first PLMN.

For example, the MME in the first PLMN communicates with the GLR and HLR/AuC/EIR in the second PLMN through the GLR in the first PLMN to authenticate the UE subscribed to the second PLMN, and may determine whether to allow disaster roaming (S-roaming) or not. If the MME allows disaster roaming (S-roaming) of the terminal subscribed to the second PLMN, the terminal subscribed to the second PLMN may establish service connection with P-GW, IMS, GLR and Internet in the second PLMN through the base station, S-GW, MME and GLR in the first PLMN.

FIG. 14 shows an example of an EPS network structure related to the disclosure of the present specification.

Referring to FIG. 14, when a failure occurs in a base station (gNB) in the second PLMN, a terminal subscribed to the second PLMN cannot receive a service through the base station in the second PLMN. When the first PLMN recognizes that a failure has occurred in the second PLMN, the base station (gNB) in the first PLMN may broadcast the SIB message including information on the second PLMN. Then, the terminal subscribed to the second PLMN (the second operator subscription terminal) may be provided with a service through the base station in the first PLMN.

For example, the AMF in the first PLMN communicates with the GLR and UDM/AuC/EIR in the second PLMN through the GLR in the first PLMN to authenticate the terminal subscribed to the second PLMN, and may determine whether to allow disaster roaming (S-roaming) or not. If the AMF allows disaster roaming (S-roaming) of the terminal subscribed to the second PLMN, the terminal subscribed to the second PLMN may establish service connection with SMF, AMF, IMS and the Internet in the second PLMN through a base station AMF, SMF, UPF, UPF, and GLR in the first PLMN.

I. Method to Support a Terminal in a Network Failure Situation

As described in the examples of FIGS. 13 and 14, even if a failure occurs in the second PLMN, the terminal subscribed to the second PLMN may receive a service through the base station of the first PLMN based on S-roaming. An example of a method for allowing the terminal to recognize the S-roaming situation will be described.

For what will be described below assumes a situation that a network failure (ie, a communication disaster) occurs in the second PLMN (eg, the network of the telecommunication service provider KT), and the terminal subscribed to the second PLMN cannot be provided with the communication service through the base station in the second PLMN. In addition, situation is assumed that the base station in the first PLMN (eg, the network of the telecommunication operator SKT) transmits the SIB message by including the second PLMN information in the SIB message, based on a preset policy or operator command (OAM (Operation and Maintenance) command) for a specific time (eg, time until the failure of the second PLMN to be resolved).

The terminal recognizing the S-roaming situation based on at least one of the first to third examples to be described later, transmits a message (eg, various types of messages such as an access request message) to the network by including information indicating that the terminal has been recognized the S-roaming situation in the message.

This message (including information indicating that the terminal has recognized the S-roaming situation) may be used for the purpose of helping control and management in the network. For example, such a message may be used to prevent signaling waste by preventing the network from continuously sending the same information (eg, information indicating an S-roaming situation) to the corresponding terminal. In addition, this message may be used for the purpose of causing the network to perform a specific operation for terminals recognizing the S-roaming situation.

For reference, the UE of FIGS. 15A to 20B means a UE subscribed to the second PLMN. The term "terminal" used in the description of FIGS. 15A to 20B refers to a terminal subscribed to the second PLMN.

For reference, the first to third examples are described below with reference to the drawings, respectively, but the operations of the first to third examples may be implemented alone, or the operations of the first to third examples may be implemented in combination.

I-1. Example Based on AS Layer Signaling (1st Example)

When a failure occurs in the second PLMN by the second operator, the base station in the first PLMN broadcasts an SIB message by including including PLMN information of the third party (other compnay) (second PLMN information) in order to provide a service to a terminal subscribed to the second PLMN in the disabled area (hereinafter also referred to as a second PLMN terminal). In this case, the base station in the first PLMN may transmit SIB message including information notifying the second PLMN terminal that the condition due to the failure or the S-roaming condition. The base station in the first PLMN may transmit information indicating that the condition due to a failure or the S-roaming condition by including the information in a specific prefix. For example, the base station in the first PLMN may include a pre-configured specific value or a pre-defined specific value in order to inform that it is an S-roaming situation in a specific field of the SIB message.

In the case of a terminal that does not support the operation based on S-roaming, even if the first PLMN base station transmits information indicating that the S-roaming situation is S-roaming, the terminal may not recognize the S-roaming situation. Such a terminal operates by determining that it has accessed the second PLMN.

In the case of a terminal supporting an operation based on S-roaming, after receiving the SIB message from the base station in the first PLMN, the terminal may use information included in the SIB message when the terminal attempts to access a specific base station among multiple base stations. For example, the terminal may use information indicating the S-roaming situation as one of the elements used when attempting to access by selecting a base station in the first PLMN among information received from multiple base stations. If the terminal needs to access the network based on the S-roaming situation due to a failure occurring in the second PLMN, the terminal may attempt to access the network through the base station in the first PLMN. In this case, the terminal may switch the operation mode of the terminal to the S-roaming mode or apply an S-roaming policy to perform a network access and a request with respect to the network.

When the terminal receives the SIB message indicating that the S-roaming situation is present or when network access is permitted, the terminal may switch the operation mode to the S-roaming mode or apply the S-roaming policy. Specifically, the time when the terminal switches the operation mode to the S-roaming mode or applies the S-roaming policy may be the time when the SIB message indicating that the S-roaming situation is received or after successful connection with the network is completed. For example, after receiving the acceptance message for the access request from the network, the terminal may switch the operation mode to the S-roaming mode or apply the S-roaming policy.

A situation in which a mobile communication service can no longer be provided through the corresponding base station is described. Temporarily (for example, hours or days, etc.) until the physical recovery of the corresponding base station is made, it is assumed that situation that the base station of the first PLMN by the first operator broadcasts the SIB message includes information on the second PLMN by a third party (other compnay) (ie, the second operator) in order to provide a service on behalf of the second operator in the affected area.

The first example may be performed in various communication systems. For example, the first example may be performed in EPC or 5GS. In addition, the first example may be performed between the EPC of the first operator and the 5GS of the second operator, or may be performed between the 5GS of the first operator and the EPC of the second operator. The description of FIGS. 15A and 15B and the description of FIGS. 16A and 16B to be described later are only examples, and the scope of the present specification is not limited to the description of FIGS. 15A and 15B and the description of FIGS. 16A and 16B.

Figure 15A:
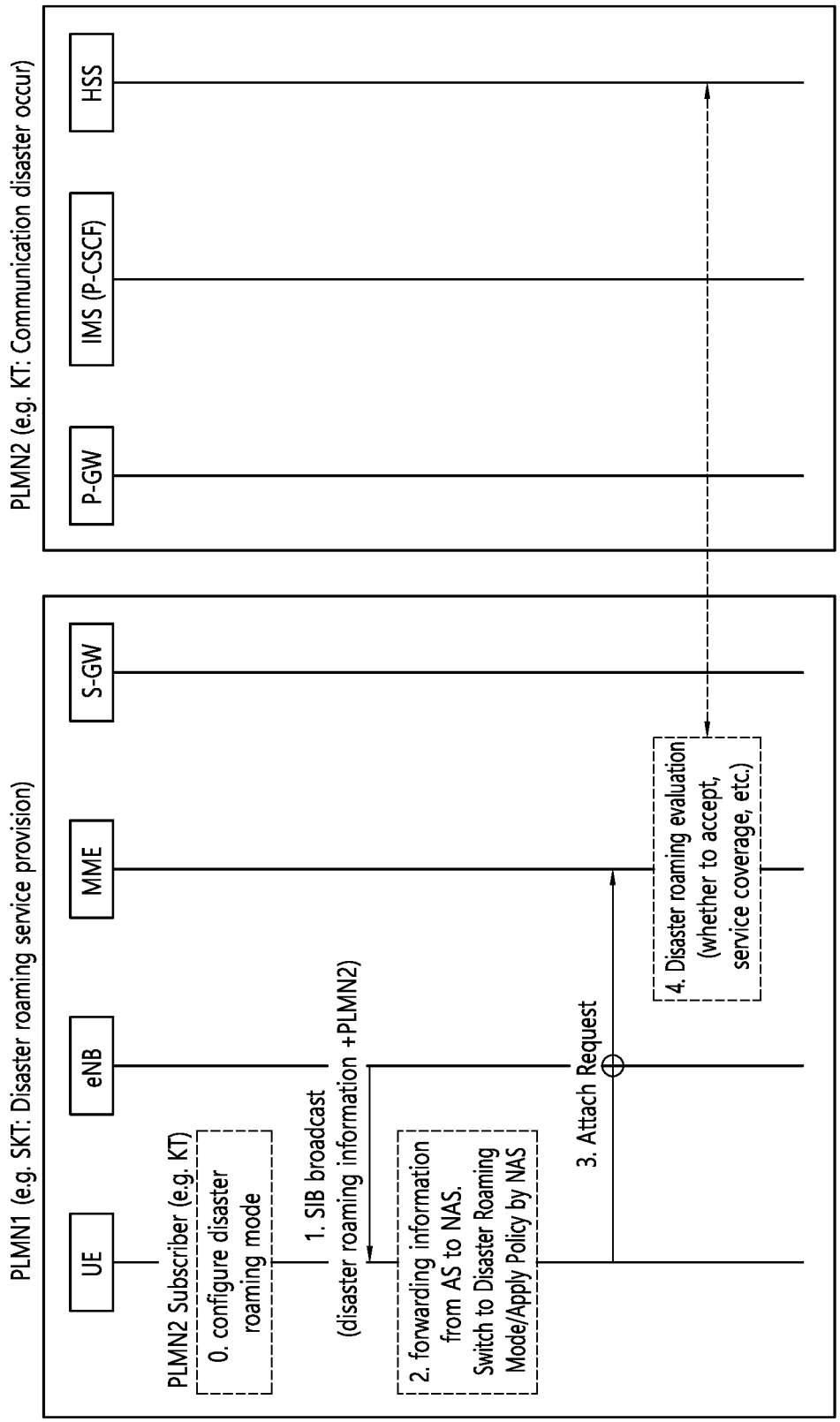

FIGS. 15A and 15B show an embodiment in which a first example of the disclosure of the present specification is applied to an EPS.

0) The terminal may configure the disaster roaming mode by user interaction or operator configuration. Specifically, when the terminal receives disaster roaming information from the network later, the terminal can be configured whether to operate in the disaster roaming mode or not by user interaction or operator configuration. For example, the disaster roaming mode setting of step 0) is a setting for whether to operate in the disaster roaming mode when a disaster roaming message is received from the network later, and is independent of whether the terminal supports the disaster roaming function, that is, it means that even a terminal supporting a roaming function may perform a different operation (eg, not operating in a disaster roaming mode) according to the settings of the user or operator.

1) The base station in the first PLMN may broadcast the information of the second PLMN by temporarily including the information of the second PLMN in the SIB message based on at least one of a preset policy or an operator command (OAM command) Upon receiving the SIB message including the information of the second PLMN, the terminal may recognize the base station in the first PLMN as the base station of the second PLMN and perform an operation of attempting to access the second PLMN. The SIB message may additionally include, directly or indirectly, information indicating a disaster roaming (network failure) situation. Here, the base station in the first PLMN may transmit the information of the second PLMN or information indicating the disaster roaming situation in the form of an AS message, that is, included in the SIB message.

2) The AS layer of the terminal may recognize at least one of information of the second PLMN included in the SIB message or information indicating a disaster roaming situation.

When the SIB message includes information notifying a disaster roaming situation, and the AS layer of the terminal recognizes this information, the AS layer of the terminal directly or indirectly provide information indicating the disaster roaming situation through the terminal's internal interface to the NAS layer of the terminal. The NAS layer of the terminal may perform at least one of an operation of switching the operation mode of the terminal to a disaster roaming mode or an operation of applying a preset disaster roaming policy based on information indicating the disaster roaming situation.

If the SIB message does not include information indicating a disaster roaming situation, but only includes the information of the second PLMN, the AS layer of the terminal cannot recognize the information indicating the disaster roaming situation, so the NAS layer of the terminal does not perform operation switching to the disaster roaming mode or operation applying the roaming policy.

3) The terminal may transmit an access request message to attempt access to the second PLMN. Here, the access request message may be an attach request message. The access request message transmitted by the terminal is physically transmitted to the MME in the first PLMN through the base station in the first PLMN.

4) The MME in the first PLMN may determine whether to allow disaster roaming. The MME may perform an interaction with the HSS in the second PLMN to check subscriber information of the terminal that has transmitted the access request message. The MME may check a set operator policy or a preset operator policy and preset roaming policy. If necessary, the MME may perform interconnection with other network nodes, such as PCRF, to check the operator policy.

Through this process, the MME may determine whether or not to allow disaster roaming of the terminal that has transmitted the access request message (eg, whether to accept access to provide disaster roaming service to the terminal) and may determine the scope of the disaster roaming service if disaster roaming is allowed. Here, the scope of the disaster roaming service may be, for example, a basic voice call and a specific service.

According to the determination result of the MME in the first PLMN, the case A operation or the case B operation may be performed.

Case A: When the MME Allows Disaster Roaming of the Terminal (when the Access Request of the Terminal is Accepted)

5A) The MME in the first PLMN may process the access request of the terminal and perform a procedure for configuring (establishing) a PDN connection for service provision. The MME in the first PLMN may exchange create session request/response messages with the P-GW in the second PLMN via the S-GW in the first PLMN.

6A) After the MME in the first PLMN successfully configures (establishes) the PDN connection, it may transmit an access acceptance message to the terminal. The connection accept message may be an attach accept message. The access acceptance message may include information on disaster roaming directly or implicitly.

Upon receiving the access acceptance message, the terminal may display information on disaster roaming to the user. For example, the terminal may display information on disaster roaming on the display unit of the terminal in a form or method recognizable by the user. Alternatively, the terminal may inform the user of information on disaster roaming using vibration or sound.

7A) The terminal may switch the operation mode to the disaster roaming mode based on information on disaster roaming included in the access acceptance message. The terminal may start applying a preset disaster roaming policy based on information on disaster roaming. For reference, the disaster roaming mode switching and application of the disaster roaming policy may be performed in step 2) described above, but may also be performed in step 7A) after the terminal receives the access acceptance message.

8A) The terminal may transmit IMS signaling to the IMS network (eg, P-CSCF) in the second PLMN through the PDN connection configured (established) in step 6A). Then, the terminal may be provided with an IMS-related service such as a voice service through IMS signaling. Specifically, the IMS signaling of the terminal may be transmitted to the IMS network in the second PLMN via the S-GW in the first PLMN and the P-GW in the second PLMN. In other words, the UE may perform IMS signaling with the IMS network in the second PLMN.

Case B: When the MME does not Allow Disaster Roaming of the Terminal (when the Access Request of the Terminal is Rejected)

5B) The MME in the first PLMN may transmit an access rejection message to the terminal. The connection rejection message may be an attach rejection message. The access rejection message may directly or implicitly include information on disaster roaming.

6B) After receiving the access rejection message, the terminal evaluates the reason for rejection of the access rejection message, and then may perform PLMN re-selection. The UE may manage the priority of the PLMN based on the information on disaster roaming. For example, the terminal may perform a control operation such as temporarily lowering the priority of the second PLMN in which disaster roaming has occurred or for a specific time.

Figure 16A:
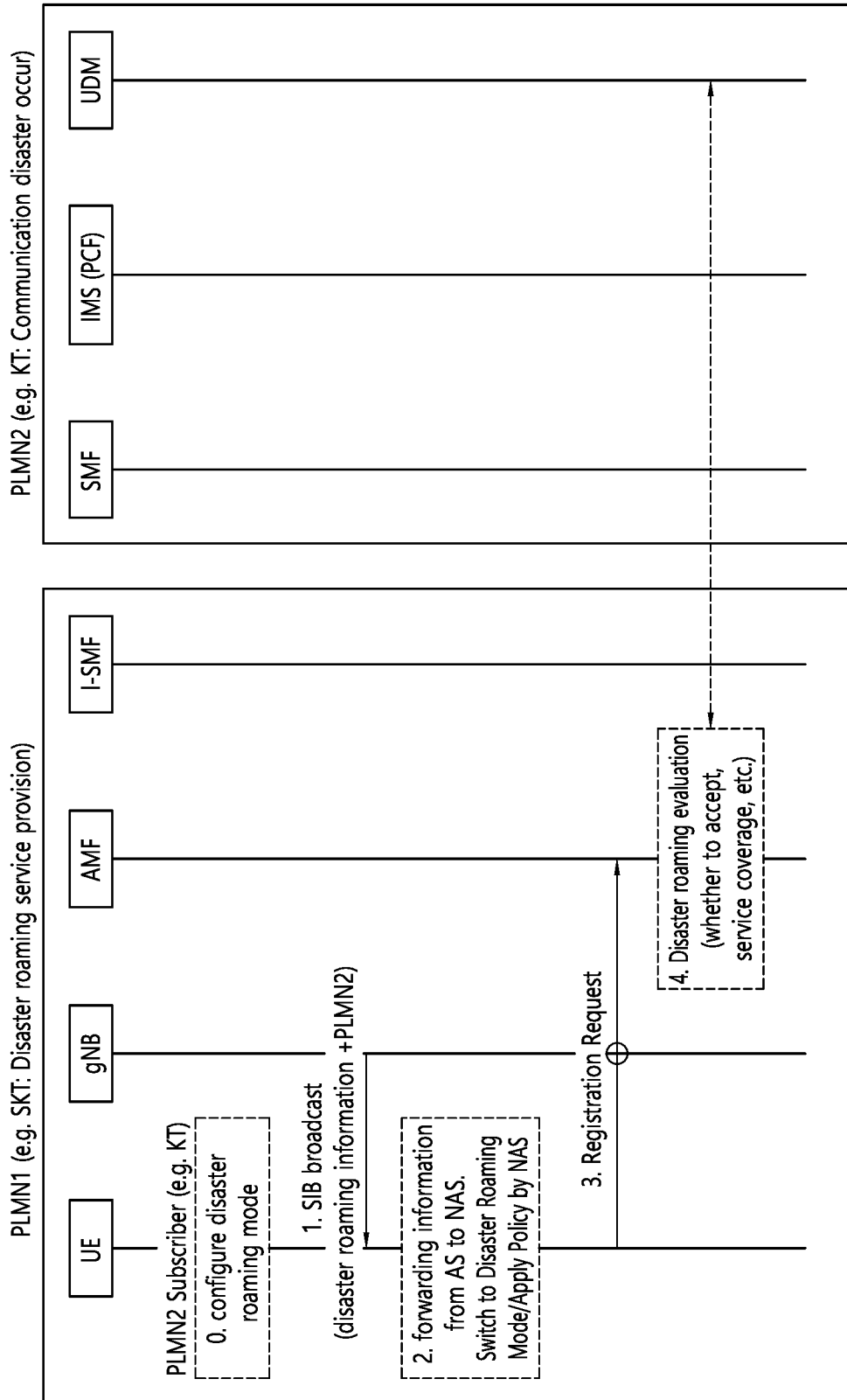
FIGS. 16A and 16B show an embodiment in which the first example of the disclosure of the present specification is applied to 5GS.
Figure 16B:
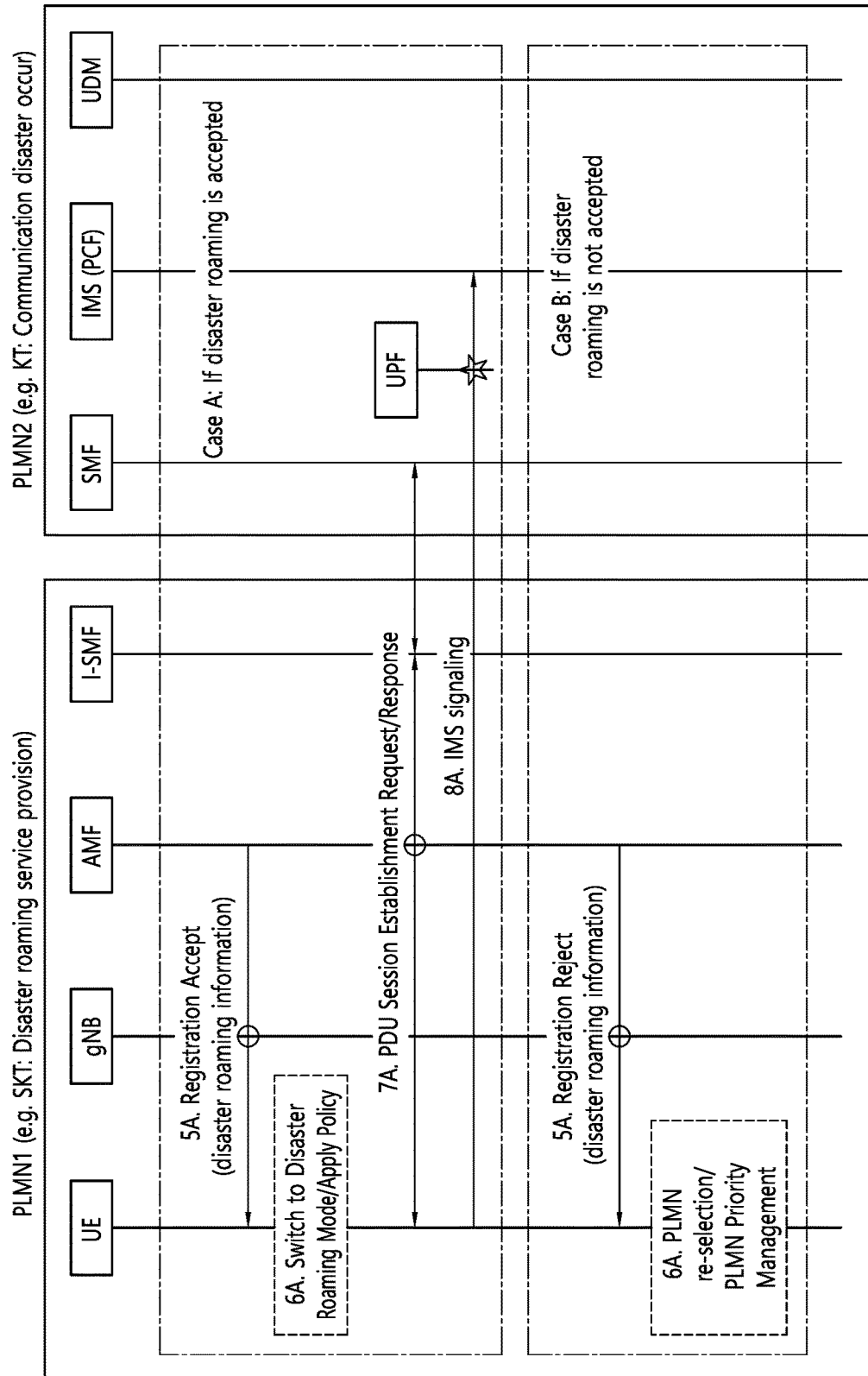

FIGS. 16A and 16B show an embodiment in which the first example of the disclosure of the present specification is applied to 5GS.

0) The terminal may configure the disaster roaming mode by user interaction or operator configuration. Specifically, when the terminal receives disaster roaming information from the network later, the terminal can be configured whether to operate in the disaster roaming mode or not by user interaction or operator configuration. For example, the disaster roaming mode setting of step 0) is a setting for whether to operate in the disaster roaming mode when a disaster roaming message is received from the network later, and is independent of whether the terminal supports the disaster roaming function, that is, it means that even a terminal supporting a roaming function may perform a different operation (eg, not operating in a disaster roaming mode) according to the settings of the user or operator.

1) The base station in the first PLMN may broadcast the information of the second PLMN by temporarily including the information of the second PLMN in the SIB message based on at least one of a preset policy or an operator command (OAM command) Upon receiving the SIB message including the information of the second PLMN, the terminal may recognize the base station in the first PLMN as the base station of the second PLMN and perform an operation of attempting to access the second PLMN. The SIB message may additionally include, directly or indirectly, information indicating a disaster roaming (network failure) situation. Here, the base station in the first PLMN may transmit the information of the second PLMN or information indicating the disaster roaming situation in the form of an AS message, that is, included in the SIB message.

2) The AS layer of the terminal may recognize at least one of information of the second PLMN included in the SIB message or information indicating a disaster roaming situation.

When the SIB message includes information notifying a disaster roaming situation, and the AS layer of the terminal recognizes this information, the AS layer of the terminal directly or indirectly provide information indicating the disaster roaming situation through the terminal's internal interface to the NAS layer of the terminal. The NAS layer of the terminal may perform at least one of an operation of switching the operation mode of the terminal to a disaster roaming mode or an operation of applying a preset disaster roaming policy based on information indicating the disaster roaming situation.

If the SIB message does not include information indicating a disaster roaming situation, but only includes the information of the second PLMN, the AS layer of the terminal cannot recognize the information indicating the disaster roaming situation, so the NAS layer of the terminal does not perform operation switching to the disaster roaming mode or operation applying the roaming policy.

3) The terminal may transmit an access request message to attempt access to the second PLMN. Here, the access request message may be an registration request message. The access request message transmitted by the terminal is physically transmitted to the AMF in the first PLMN through the base station in the first PLMN.

4) The AMF in the first PLMN may determine whether to allow disaster roaming. The AMF may perform an interaction with the UDM in the second PLMN to check subscriber information of the terminal that has transmitted the access request message. The AMF may check a set operator policy or a preset operator policy and preset roaming policy. If necessary, the AMF may perform interconnection with other network nodes, such as PCF, to check the operator policy.

Through this process, the AMF may determine whether or not to allow disaster roaming of the terminal that has transmitted the access request message (eg, whether to accept access to provide disaster roaming service to the terminal) and may determine the scope of the disaster roaming service if disaster roaming is allowed. Here, the scope of the disaster roaming service may be, for example, a basic voice call and a specific service.

According to the determination result of the AMF in the first PLMN, the case A operation or the case B operation may be performed.

Case A: When the AMF Allows Disaster Roaming of the Terminal (when the Access Request of the Terminal is Accepted)

5A) The AMF in the first PLMN may transmit an access acceptance message to the terminal. The connection accept message may be a registration accept message. The access acceptance message may include information on disaster roaming directly or implicitly.

Upon receiving the access acceptance message, the terminal may display information on disaster roaming to the user. For example, the terminal may display information on disaster roaming on the display unit of the terminal in a form or method recognizable by the user. Alternatively, the terminal may inform the user of information on disaster roaming using vibration or sound.

6A) The terminal may switch the operation mode to the disaster roaming mode based on information on disaster roaming included in the access acceptance message. The terminal may start applying a preset disaster roaming policy based on information on disaster roaming. For reference, the disaster roaming mode switching and application of the disaster roaming policy may be performed in step 2) described above, but may also be performed in step 6A) after the terminal receives the access acceptance message.

7A) The terminal may transmit the PDU session establishment request message to the SMF in the second PLMN via the base station and the AMF in the first PLMN.

The difference from the embodiment applied to the EPS described in FIGS. 15A and 15B is that in the embodiment applied to the 5GS, the SMF in the second PLMN may perform additional disaster roaming evaluation. For example, the SMF in the second PLMN may allow the disaster roaming service only for a specific PDU session among PDU sessions. In other words, the SMF in the second PLMN may determine the range of the emergency roaming service of the terminal.

The AMF in the first PLMN may communicate with the SMF (intermediate SMF (I-SMF) in FIGS. 16A and 16B) in the first PLMN, and the SMF in the first PLMN may communicate with the SMF in the second PLMN. That is, the SMF in the first PLMN may transmit and receive messages for communicating with the SMF in the second PLMN. The SMF in the first PLMN may perform the role of the I-SMF.

Alternatively, unlike shown, according to the disaster roaming deployment option, the AMF in the first PLMN may perform direct communication with the SMF in the second PLMN, which is the home PLMN of the terminal, and may transmit and receive messages with the SMF in the second PLMN.

Upon receiving the PDU session establishment request message, the SMF in the second PLMN may transmit the PDU session establishment response message to the terminal through the AMF of the first PLMN and the base station in the first PLMN.

8A) The UE may transmit IMS signaling to the IMS network (eg, PCF) in the second PLMN through the PDU session configured (established) in step 7A). Then, the terminal may be provided with an IMS-related service such as a voice service through IMS signaling. Specifically, the IMS signaling of the terminal may be transmitted to the IMS network in the second PLMN through the base station in the first PLMN, the UPF in the first PLMN (not shown in FIGS. 16A and 16B), and the UPF in the second PLMN. In other words, the UE may perform IMS signaling with the IMS network in the second PLMN.

Case B: When the AMF does not Allow Disaster Roaming of the Terminal (when the Access Request of the Terminal is Rejected)

5B) The AMF in the first PLMN may transmit an access rejection message to the terminal. The connection rejection message may be an attach rejection message. The access rejection message may directly or implicitly include information on disaster roaming.

6B) After receiving the access rejection message, the terminal evaluates the reason for rejection of the access rejection message, and then may perform PLMN re-selection. The UE may manage the priority of the PLMN based on the information on disaster roaming. For example, the terminal may perform a control operation such as temporarily lowering the priority of the second PLMN in which disaster roaming has occurred or for a specific time.

I-2. Example Based on NAS Layer Signaling (2nd Example)

When a failure occurs in the second PLMN by the second operator, the base station in the first PLMN may broadcast an SIB message by including PLMN information of a third party (other compnay) (second PLMN information) in order to provide a service to a terminal (hereinafter also referred to as a second PLMN terminal) subscribed to the second PLMN in the disabled area.

When the terminal transmits an access request message to the network, the terminal does not recognize that a disaster roaming situation will proceed. The terminal transmits a general access request message to the base station in the first PLMN. That is, the terminal transmits the access request message to the base station in the first PLMN in the same manner as the method of transmitting the access request message to the second PLMN to which it is subscribed.

A network node (eg, MME or AMF) in the first PLMN may transmit an access acceptance message to the terminal based on information of the terminal, subscriber information, roaming agreement (eg, agreement on network failure situation) information, and the like. In this case, the network node in the first PLMN may inform the terminal of the S-roaming situation through a NAS message.

In the case of a terminal that does not support the operation based on S-roaming, even if the first PLMN base station transmits information indicating the S-roaming situation, the terminal may not recognize the S-roaming situation. Such a terminal operates by determining that it has accessed the second PLMN.

In the case of a terminal supporting an operation based on S-roaming, after receiving the SIB message from the base station in the first PLMN, the terminal may use information included in the SIB message when the terminal attempts to access a specific base station among multiple base stations. For example, the terminal may use information indicating the S-roaming situation as one of the elements used when attempting to access by selecting a base station in the first PLMN among information received from multiple base stations. If the terminal needs to access the network based on the S-roaming situation due to a failure occurring in the second PLMN, the terminal may attempt to access the network through the base station in the first PLMN. In this case, the terminal may switch the operation mode of the terminal to the S-roaming mode or apply an S-roaming policy to perform a network access and a request with respect to the network.

Additionally, the terminal may operate in the S-roaming mode or the terminal may apply the S-roaming policy only in a situation in which the terminal is connected to the base station of the first PLMN through the interaction between the AS layer and the NAS layer of the terminal. For example, when the network node recognizes that the base station to which the terminal is connected has changed while the terminal is connected to the network, the network node may review again whether the current terminal situation is the S-roaming situation. And, the network node may transmit the review result to the terminal as a NAS message.

For example, the terminal may move out of the failure area, and the base station to which the terminal is connected may be changed to a base station in the second PLMN, and the terminal may be connected to the second PLMN core network. Then, the network node (eg, MME or AMF, etc.) of the second PLMN can recognize that there was the S-roaming situation by checking the context of the terminal according to the conventional procedure, and transmit Information indicating that S-roaming it has been released to the terminal as a NAS message.

The second example may be performed in various communication systems. For example, the second example may be performed in EPC or 5GS. In addition, the second example may be performed between the EPC of the first operator and the 5GS of the second operator, or may be performed between the 5GS of the first operator and the EPC of the second operator. The description of FIG. 17 and the description of FIGS. 18A and 18B, which will be described later, are only examples, and the scope of the present specification is not limited to the description of FIG. 17 and the description of FIGS. 18A and 18B.

Figure 17A:
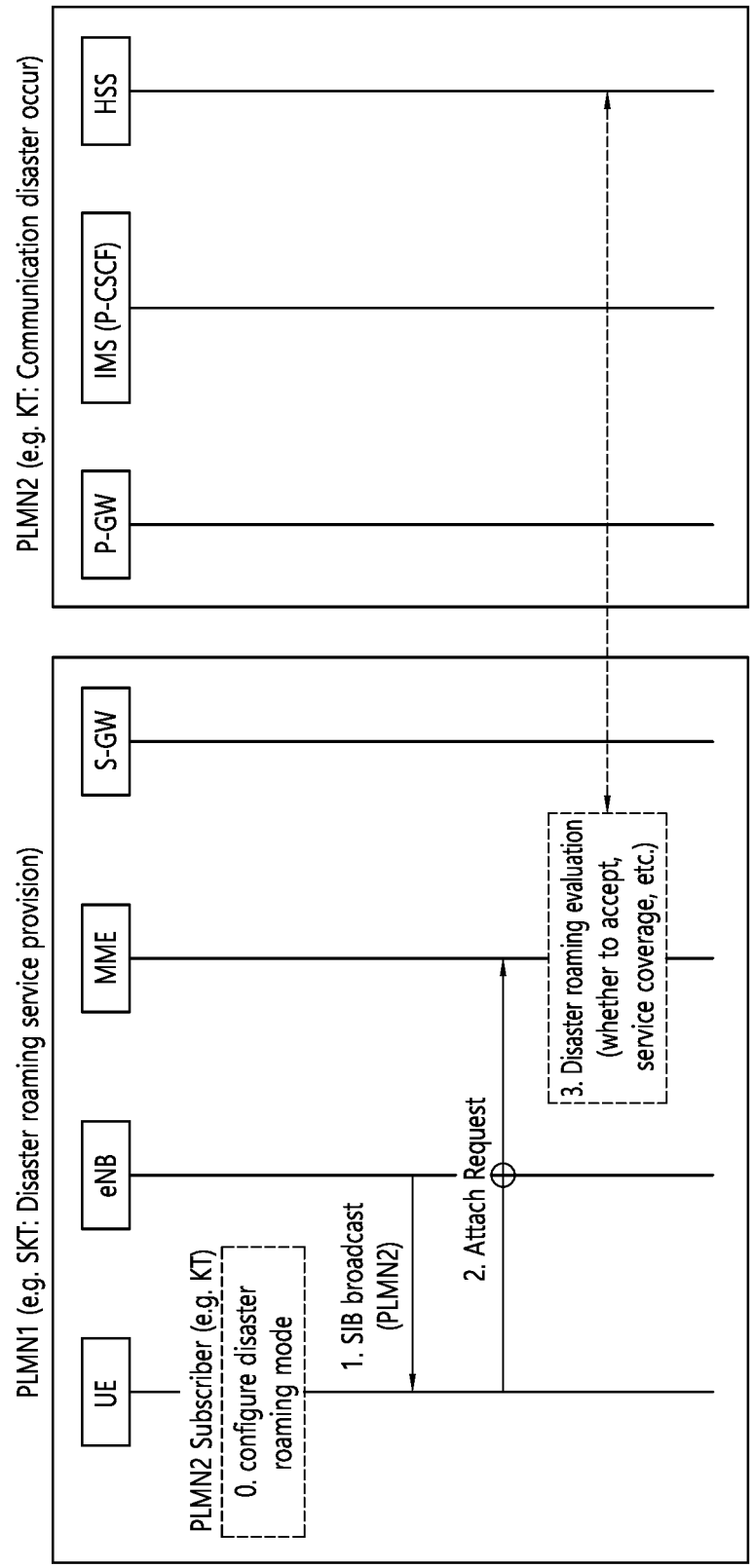
FIGS. 17A and 17B show an embodiment in which a second example of the disclosure of the present specification is applied to an EPS.
Figure 17B:
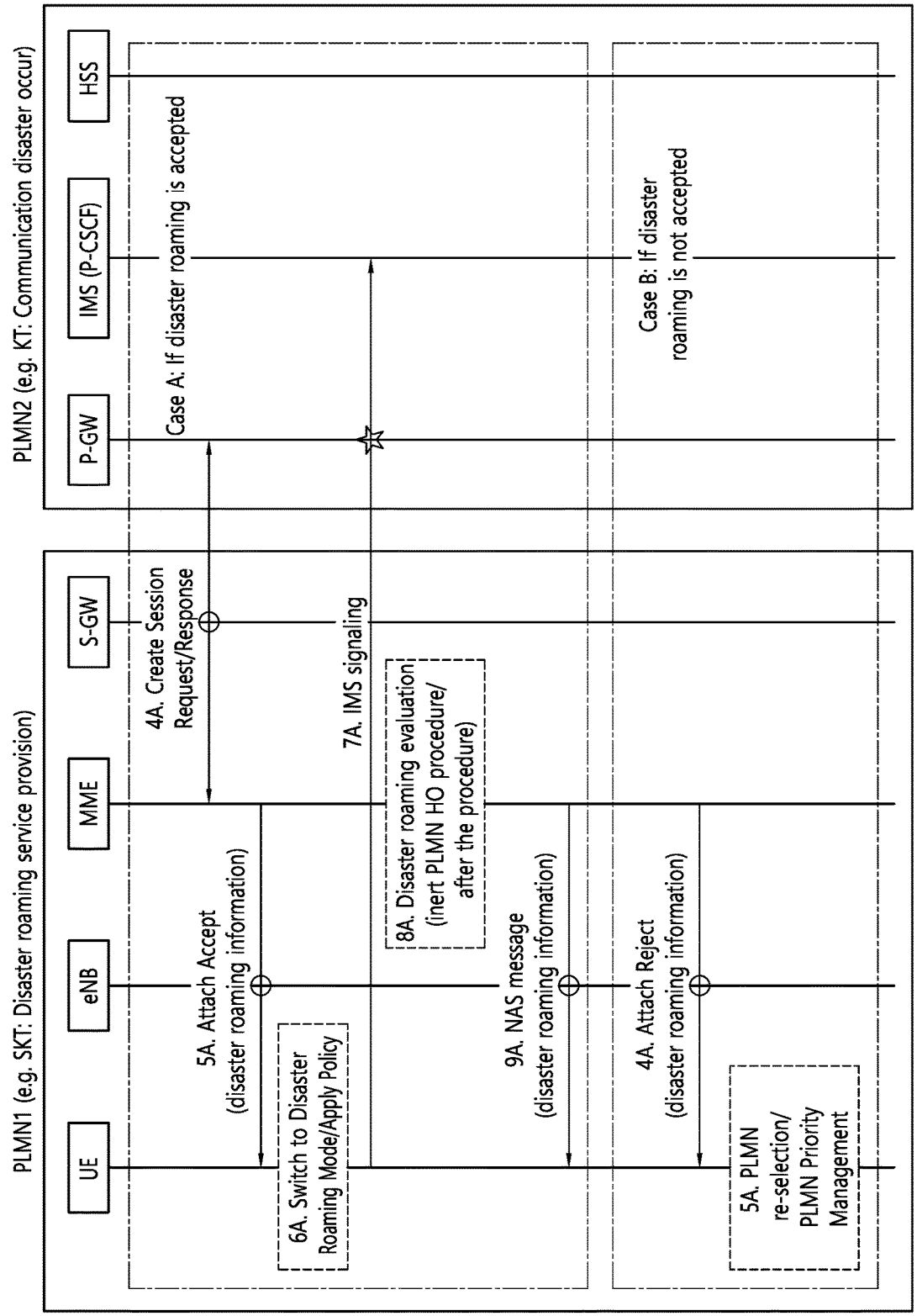

FIGS. 17A and 17B show an embodiment in which a second example of the disclosure of the present specification is applied to an EPS.

0) The terminal may configure the disaster roaming mode by user interaction or operator configuration. Specifically, when the terminal receives disaster roaming information from the network later, the terminal can be configured whether to operate in the disaster roaming mode or not by user interaction or operator configuration. For example, the disaster roaming mode setting of step 0) is a setting for whether to operate in the disaster roaming mode when a disaster roaming message is received from the network later, and is independent of whether the terminal supports the disaster roaming function, that is, it means that even a terminal supporting a roaming function may perform a different operation (eg, not operating in a disaster roaming mode) according to the settings of the user or operator.

1) The base station in the first PLMN may broadcast the information of the second PLMN by temporarily including the information of the second PLMN in the SIB message based on at least one of a preset policy or an operator command (OAM command) Upon receiving the SIB message including the information of the second PLMN, the terminal may recognize the base station in the first PLMN as the base station of the second PLMN and perform an operation of attempting to access the second PLMN. The SIB message may additionally include, directly or indirectly, information indicating a disaster roaming (network failure) situation.

2) The terminal may transmit an access request message to attempt access to the second PLMN. Here, the access request message may be an attach request message. The access request message transmitted by the terminal is physically transmitted to the MME in the first PLMN through the base station in the first PLMN.

3) The MME in the first PLMN may determine whether to allow disaster roaming. The MME may perform an interaction with the HSS in the second PLMN to check subscriber information of the terminal that has transmitted the access request message. The MME may check a set operator policy or a preset operator policy and preset roaming policy. If necessary, the MME may perform interconnection with other network nodes, such as PCRF, to check the operator policy.

Through this process, the MME may determine whether or not to allow disaster roaming of the terminal that has transmitted the access request message (eg, whether to accept access to provide disaster roaming service to the terminal) and may determine the scope of the disaster roaming service if disaster roaming is allowed. Here, the scope of the disaster roaming service may be, for example, a basic voice call and a specific service.

According to the determination result of the MME in the first PLMN, the case A operation or the case B operation may be performed.

Case A: When the MME Allows Disaster Roaming of the Terminal (when the Access Request of the Terminal is Accepted)

4A) The MME in the first PLMN may process the access request of the terminal and perform a procedure for configuring (establishing) a PDN connection for service provision. The MME in the first PLMN may exchange create session request/response messages with the P-GW in the second PLMN via the S-GW in the first PLMN.

5A) After the MME in the first PLMN successfully configures (establishes) the PDN connection, it may transmit an access acceptance message to the terminal. The connection accept message may be an attach accept message. The access acceptance message may include information on disaster roaming directly or implicitly. Here, information on disaster roaming may be included in the access acceptance message in the form of a NAS message.

Upon receiving the access acceptance message, the terminal may display information on disaster roaming to the user. For example, the terminal may display information on disaster roaming on the display unit of the terminal in a form or method recognizable by the user. Alternatively, the terminal may inform the user of information on disaster roaming using vibration or sound.

6A) The terminal may switch the operation mode to the disaster roaming mode based on information on disaster roaming included in the access acceptance message. The terminal may start applying a preset disaster roaming policy based on information on disaster roaming.

7A) The terminal may transmit IMS signaling to the IMS network (eg, P-CSCF) in the second PLMN through the PDN connection configured (established) in step 5A). Then, the terminal may be provided with an IMS-related service such as a voice service through IMS signaling. Specifically, the IMS signaling of the terminal may be transmitted to the IMS network in the second PLMN via the S-GW in the first PLMN and the P-GW in the second PLMN. In other words, the UE may perform IMS signaling with the IMS network in the second PLMN.

8A) If the network node (eg, MME) detects that the base station to which the terminal is connected is changed while the terminal is receiving a service based on disaster roaming, the MME may perform disaster roaming evaluation again. For example, if the base station to which the terminal is connected is changed based on a procedure such as inter-PLMN handover, the MME may perform disaster roaming evaluation again.

9A) The MME in the first PLMN may transmit the result of the disaster roaming evaluation performed in 8A to the terminal as a NAS message. Here, the NAS message may be a detach message or a NAS message indicating a disaster roaming evaluation result. The terminal may perform a subsequent operation, such as changing the operation mode from the disaster roaming mode to the normal mode or maintaining the disaster roaming mode, based on the received NAS message.

Case B: When the MME does not Allow Disaster Roaming of the Terminal (when the Access Request of the Terminal is Rejected)

4B) The MME in the first PLMN may transmit an access rejection message to the terminal. The connection rejection message may be an attach rejection message. The access rejection message may directly or implicitly include information on disaster roaming.

5B) After receiving the access rejection message, the terminal evaluates the reason for rejection of the access rejection message, and then may perform PLMN re-selection. The UE may manage the priority of the PLMN based on the information on disaster roaming. For example, the terminal may perform a control operation such as temporarily lowering the priority of the second PLMN in which disaster roaming has occurred or for a specific time.

Figure 18A:
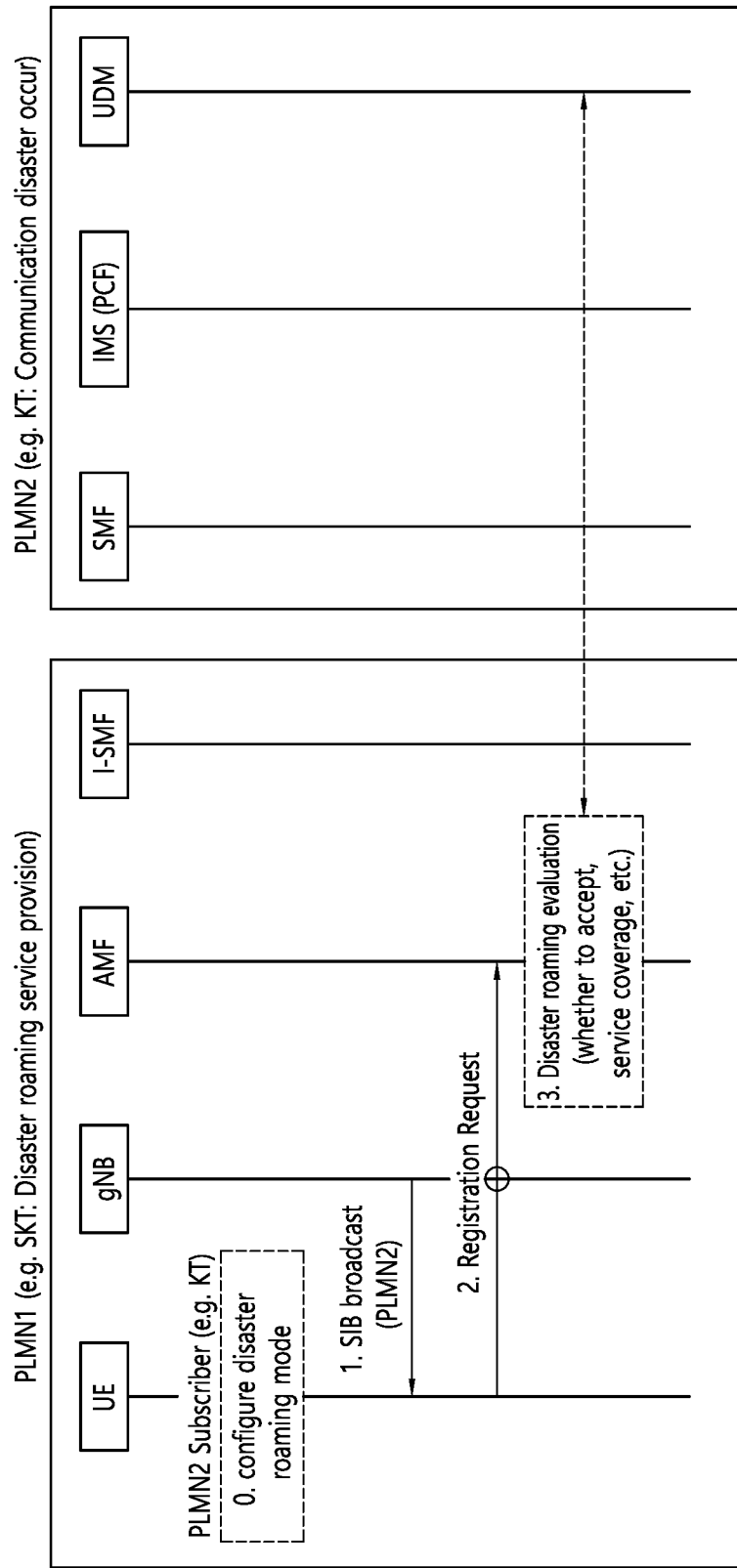
FIGS. 18A and 18B show an embodiment in which a second example of the disclosure of the present specification is applied to 5GS.
Figure 18B:
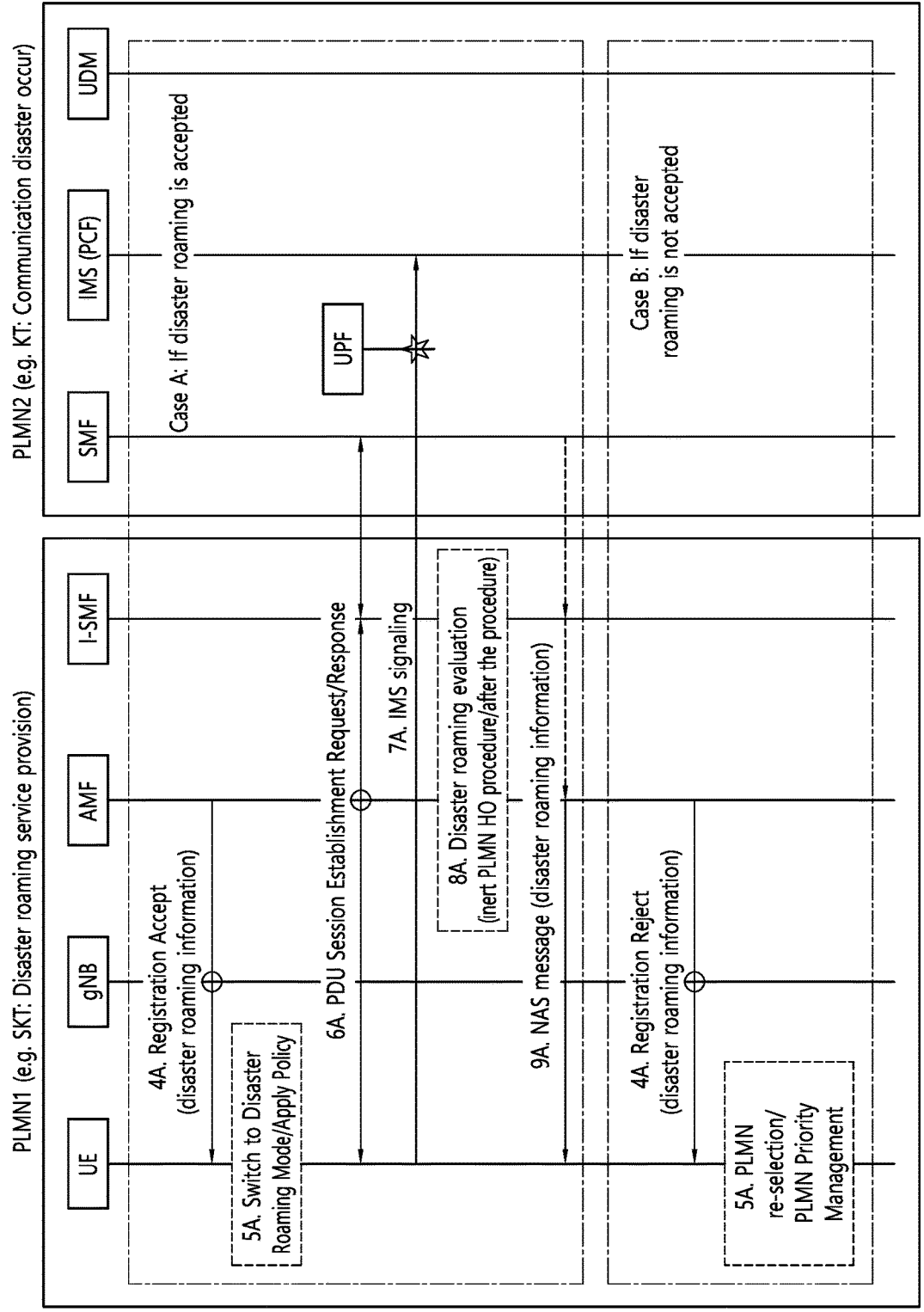

FIGS. 18A and 18B show an embodiment in which a second example of the disclosure of the present specification is applied to 5GS.

0) The terminal may configure the disaster roaming mode by user interaction or operator configuration. Specifically, when the terminal receives disaster roaming information from the network later, the terminal can be configured whether to operate in the disaster roaming mode or not by user interaction or operator configuration. For example, the disaster roaming mode setting of step 0) is a setting for whether to operate in the disaster roaming mode when a disaster roaming message is received from the network later, and is independent of whether the terminal supports the disaster roaming function, that is, it means that even a terminal supporting a roaming function may perform a different operation (eg, not operating in a disaster roaming mode) according to the settings of the user or operator.

1) The base station in the first PLMN may broadcast the information of the second PLMN by temporarily including the information of the second PLMN in the SIB message based on at least one of a preset policy or an operator command (OAM command) Upon receiving the SIB message including the information of the second PLMN, the terminal may recognize the base station in the first PLMN as the base station of the second PLMN and perform an operation of attempting to access the second PLMN. The SIB message may additionally include, directly or indirectly, information indicating a disaster roaming (network failure) situation. Here, the base station in the first PLMN may transmit the information of the second PLMN or information indicating the disaster roaming situation in the form of an NAS message, that is, included in the SIB message.

2) The terminal may transmit an access request message to attempt access to the second PLMN. Here, the access request message may be an registration request message. The access request message transmitted by the terminal is physically transmitted to the AMF in the first PLMN through the base station in the first PLMN.

3) The AMF in the first PLMN may determine whether to allow disaster roaming. The AMF may perform an interaction with the UDM in the second PLMN to check subscriber information of the terminal that has transmitted the access request message. The AMF may check a set operator policy or a preset operator policy and preset roaming policy. If necessary, the AMF may perform interconnection with other network nodes, such as PCF, to check the operator policy.

Through this process, the AMF may determine whether or not to allow disaster roaming of the terminal that has transmitted the access request message (eg, whether to accept access to provide disaster roaming service to the terminal) and may determine the scope of the disaster roaming service if disaster roaming is allowed. Here, the scope of the disaster roaming service may be, for example, a basic voice call and a specific service.

According to the determination result of the AMF in the first PLMN, the case A operation or the case B operation may be performed.

Case A: When the AMF Allows Disaster Roaming of the Terminal (when the Access Request of the Terminal is Accepted)

4A) The AMF in the first PLMN may transmit an access acceptance message to the terminal. The connection accept message may be a registration accept message. The access acceptance message may include information on disaster roaming directly or implicitly. Here, information on disaster roaming may be included in the access acceptance message in the form of a NAS message.

Upon receiving the access acceptance message, the terminal may display information on disaster roaming to the user. For example, the terminal may display information on disaster roaming on the display unit of the terminal in a form or method recognizable by the user. Alternatively, the terminal may inform the user of information on disaster roaming using vibration or sound.

5A) The terminal may switch the operation mode to the disaster roaming mode based on information on disaster roaming included in the access acceptance message. The terminal may start applying a preset disaster roaming policy based on information on disaster roaming.

6A) The terminal may transmit the PDU session establishment request message to the SMF in the second PLMN via the base station and the AMF in the first PLMN.

The difference from the embodiment applied to the EPS described in FIG. 17 is that in the embodiment applied to the 5GS, the SMF in the second PLMN may perform additional disaster roaming evaluation. For example, the SMF in the second PLMN may allow the disaster roaming service only for a specific PDU session among PDU sessions. In other words, the SMF in the second PLMN may determine the range of the emergency roaming service of the terminal.

The AMF in the first PLMN may communicate with the SMF (intermediate SMF (I-SMF) in FIGS. 18A and 18B) in the first PLMN, and the SMF in the first PLMN may communicate with the SMF in the second PLMN. That is, the SMF in the first PLMN may transmit and receive messages for communicating with the SMF in the second PLMN. The SMF in the first PLMN may perform the role of the I-SMF.

Alternatively, unlike shown, according to the disaster roaming deployment option, the AMF in the first PLMN may perform direct communication with the SMF in the second PLMN, which is the home PLMN of the terminal, and may transmit and receive messages with the SMF in the second PLMN.

Upon receiving the PDU session establishment request message, the SMF in the second PLMN may transmit the PDU session establishment response message to the terminal through the AMF of the first PLMN and the base station in the first PLMN.

7A) The UE may transmit IMS signaling to the IMS network (eg, PCF) in the second PLMN through the PDU session configured (established) in step 6A). Then, the terminal may be provided with an IMS-related service such as a voice service through IMS signaling. Specifically, the IMS signaling of the terminal may be transmitted to the IMS network in the second PLMN through the base station in the first PLMN, the UPF in the first PLMN (not shown in FIGS. 18A and 18B), and the UPF in the second PLMN. In other words, the UE may perform IMS signaling with the IMS network in the second PLMN.

8A) If the network node (eg, AMF) detects that the base station to which the terminal is connected is changed while the terminal is receiving a service based on disaster roaming, the AMF may perform disaster roaming evaluation again. For example, if the base station to which the terminal is connected is changed based on a procedure such as inter-PLMN handover, the AMF may perform disaster roaming evaluation again.

The difference from the embodiment applied to the EPS described in FIG. 17 is that in the embodiment applied to the 5GS, the SMF in the second PLMN may also perform additional disaster roaming evaluation. When the SMF in the second PLMN performs additional disaster roaming evaluation, an interaction may occur between the AMF in the first PLMN, the I-SMF in the first PLMN, and the SMF in the second PLMN as needed.

9A) The AMF in the first PLMN may transmit the result of the disaster roaming evaluation performed in 8A to the terminal as a NAS message. Here, the NAS message may be a detach message or a NAS message indicating a disaster roaming evaluation result. The terminal may perform a subsequent operation, such as switching the operation mode from the disaster roaming mode to the normal mode or maintaining the disaster roaming mode, based on the received NAS message.

Case B: When the AMF does not Allow Disaster Roaming of the Terminal (when the Access Request of the Terminal is Rejected)

4B) The AMF in the first PLMN may transmit an access rejection message to the terminal. The connection rejection message may be an attach rejection message. The access rejection message may directly or implicitly include information on disaster roaming.

5B) After receiving the access rejection message, the terminal evaluates the reason for rejection of the access rejection message, and then may perform PLMN re-selection. The UE may manage the priority of the PLMN based on the information on disaster roaming. For example, the terminal may perform a control operation such as temporarily lowering the priority of the second PLMN in which disaster roaming has occurred or for a specific time.

I-3. Examples Based on SMS (Short Message Service) or MMS (Multimedia Messaging Service), Etc. (3rd Example)

When a failure occurs in the second PLMN by the second operator, the base station in the first PLMN may broadcast an SIB message by including PLMN information of a third party (other compnay) (second PLMN information) in order to provide a service to a terminal (hereinafter also referred to as a second PLMN terminal) subscribed to the second PLMN in the disabled area.

When the terminal transmits an access request message to the network, the terminal does not recognize that a disaster roaming situation will proceed. The terminal transmits a general access request message to the base station in the first PLMN. That is, the terminal transmits the access request message to the base station in the first PLMN in the same manner as the method of transmitting the access request message to the second PLMN to which it is subscribed.

After the terminal normally accesses to the network through the base station in the first PLMN in a state where the terminal is not aware of the disaster roaming situation, the operator may transmit information related to S-roaming situation through at least one of SMS, MMS, and PDN connection (or PDU session) for a specific service information.

Upon receiving the information on the S-roaming situation, the terminal may switch the operation mode to the S-roaming mode. That is, the terminal may identify information about the S-roaming situation received through SMS, MMS, and a PDN connection (or PDU session) for a specific service, and operate in the S-roaming mode.

The S-roaming mode may be implemented without operating in a standardized mode for the terminal. Therefore, the terminal may not explicitly switch the operation mode to the S-roaming mode. Even if the terminal does not explicitly operate in the S-roaming mode, when the terminal performs a decision to request a service/call or performs a request operation for a network, the operator policy for a disaster situation may be reflected.

The third example may be performed in various communication systems. For example, the third example may be performed in EPC or 5GS. In addition, the third example may be performed between the EPC of the first operator and the 5GS of the second operator, or may be performed between the 5GS of the first operator and the EPC of the second operator. The description of FIGS. 19A and 19B and the description of FIGS. 20A and 20B to be described later are only examples, and the scope of the present specification is not limited to the description of FIGS. 19A and 19B and the description of FIGS. 20A and 20B.

Figure 19A:
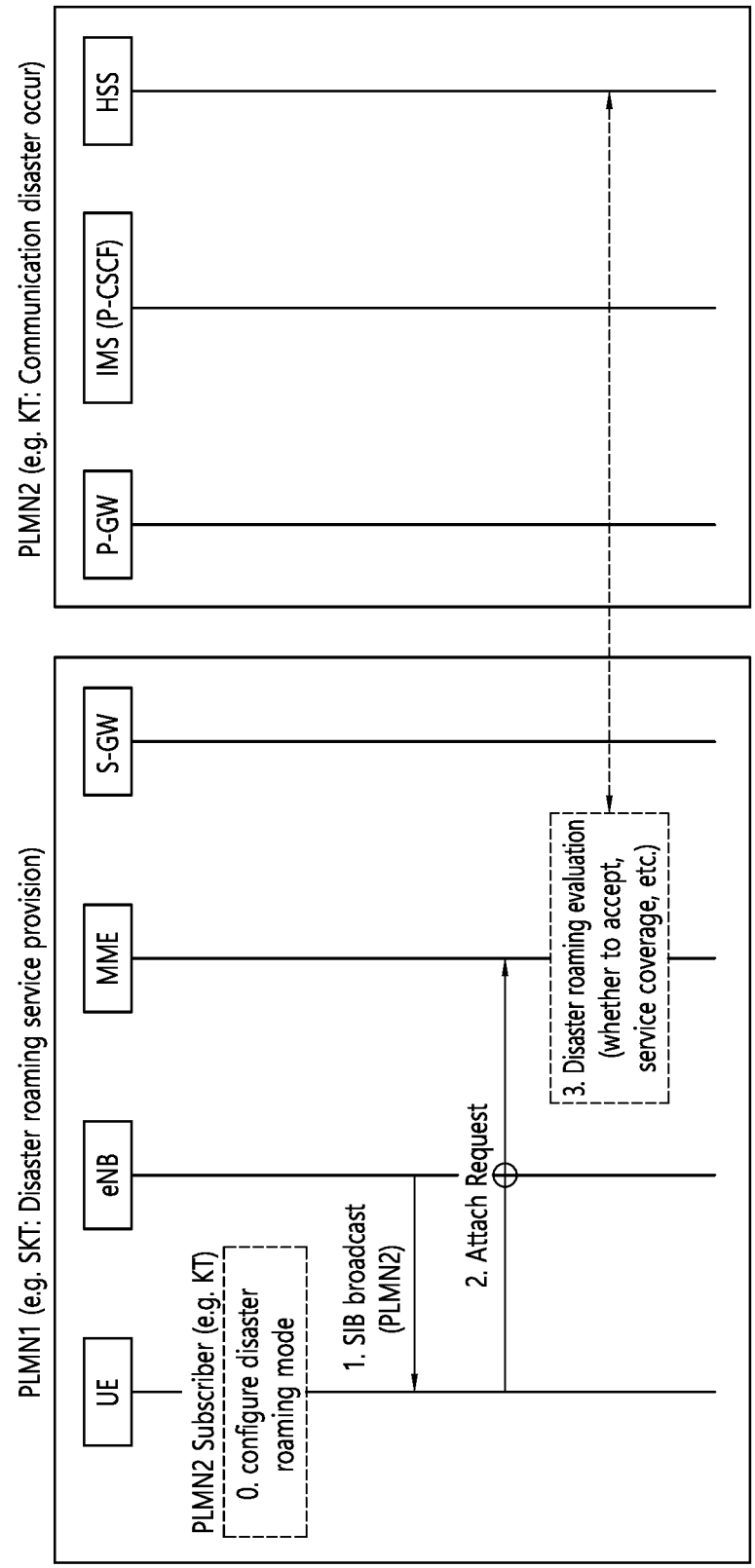
FIGS. 19A and 19B show an embodiment in which a third example of the disclosure of the present specification is applied to EPS.
Figure 19B:
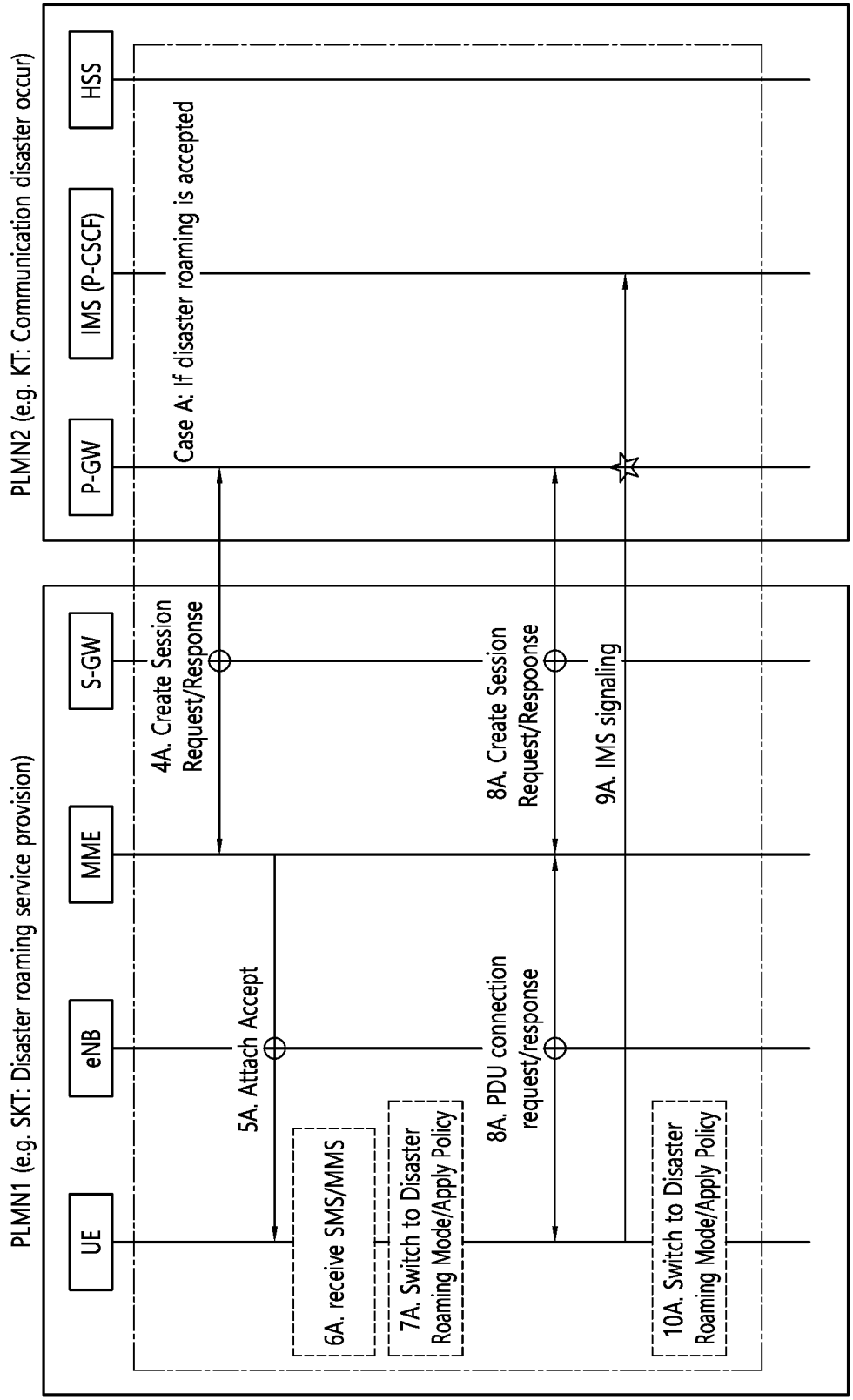

FIGS. 19A and 19B show an embodiment in which a third example of the disclosure of the present specification is applied to EPS.

0) The terminal may configure the disaster roaming mode by user interaction or operator configuration. Specifically, when the terminal receives disaster roaming information from the network later, the terminal can be configured whether to operate in the disaster roaming mode or not by user interaction or operator configuration. For example, the disaster roaming mode setting of step 0) is a setting for whether to operate in the disaster roaming mode when a disaster roaming message is received from the network later, and is independent of whether the terminal supports the disaster roaming function, that is, it means that even a terminal supporting a roaming function may perform a different operation (eg, not operating in a disaster roaming mode) according to the settings of the user or operator.

1) The base station in the first PLMN may broadcast the information of the second PLMN by temporarily including the information of the second PLMN in the SIB message based on at least one of a preset policy or an operator command (OAM command) Upon receiving the SIB message including the information of the second PLMN, the terminal may recognize the base station in the first PLMN as the base station of the second PLMN and perform an operation of attempting to access the second PLMN. The SIB message may additionally include, directly or indirectly, information indicating a disaster roaming (network failure) situation.

2) The terminal may transmit an access request message to attempt access to the second PLMN. Here, the access request message may be an attach request message. The access request message transmitted by the terminal is physically transmitted to the MME in the first PLMN through the base station in the first PLMN.

3) The MME in the first PLMN may determine whether to allow disaster roaming. The MME may perform an interaction with the HSS in the second PLMN to check subscriber information of the terminal that has transmitted the access request message. The MME may check a set operator policy or a preset operator policy and preset roaming policy. If necessary, the MME may perform interconnection with other network nodes, such as PCRF, to check the operator policy.

Through this process, the MME may determine whether or not to allow disaster roaming of the terminal that has transmitted the access request message (eg, whether to accept access to provide disaster roaming service to the terminal) and may determine the scope of the disaster roaming service if disaster roaming is allowed. Here, the scope of the disaster roaming service may be, for example, a basic voice call and a specific service.

According to the determination result of the MME in the first PLMN, the case A operation or the case B operation may be performed.

Case A: When the MME Allows Disaster Roaming of the Terminal (when the Access Request of the Terminal is Accepted)

4A) The MME in the first PLMN may process the access request of the terminal and perform a procedure for configuring (establishing) a PDN connection for service provision. The MME in the first PLMN may exchange create session request/response messages with the P-GW in the second PLMN via the S-GW in the first PLMN.

5A) After the MME in the first PLMN successfully configures (establishes) the PDN connection, it may transmit an access acceptance message to the terminal. The connection accept message may be an attach accept message. The access acceptance message may include information on disaster roaming directly or implicitly.

Upon receiving the access acceptance message, the terminal may display information on disaster roaming to the user. For example, the terminal may display information on disaster roaming on the display unit of the terminal in a form or method recognizable by the user. Alternatively, the terminal may inform the user of information on disaster roaming using vibration or sound.

6A) The terminal may receive an SMS or MMS message including information on disaster roaming Here, the SMS or MMS message may be transmitted from the MME.

The terminal may initiate a procedure for configuring (establishing) an additional PDN connection without user interaction based on previously set information on disaster roaming Here, the additional PDN connection may be used for the terminal to be connected to a specific server in case of a disaster to receive disaster-related guidance information from the specific server. Alternatively, the terminal may initiate a procedure for configuring (establishing) an additional PDN connection by user interaction. Here, the additional PDN connection may be established to connect to a server used only in case of a disaster, rather than an internet PDN used by the terminal for general communication purposes.

7A) The terminal may switch the operation mode to the disaster roaming mode based on information on disaster roaming included in SMS or MMS. The terminal may start applying a preset disaster roaming policy based on information on disaster roaming.

8A) If the SMS or MMS includes information on a server that induces access in case of a disaster, the terminal may perform a procedure for configuring (establishing) a PDN connection.

The terminal may transmit the PDN connection request message to the P-GW in the second PLMN through the MME in the first PLMN. In addition, the P-GW in the second PLMN may transmit a response message (PDN connection accept (or reject) message) to the PDN connection request message through the MME in the first PLMN.

9A) The terminal may transmit IMS signaling to the IMS network (eg, P-CSCF) in the second PLMN through the PDN connection configured (established) in step 8A). Then, the terminal may be provided with an IMS-related service such as a voice service through IMS signaling. Specifically, the IMS signaling of the UE may be transmitted to the IMS network in the second PLMN via the S-GW in the first PLMN and the P-GW in the second PLMN. In other words, the UE may perform IMS signaling with the IMS network in the second PLMN.

10A) After receiving the response message to the PDN connection request message, the UE may change the operation mode to the disaster roaming mode and apply the disaster roaming policy. The terminal may start applying a preset disaster roaming policy based on information on disaster roaming. For reference, the disaster roaming mode conversion and application of the disaster roaming policy may be performed in step 7A), or may be performed in step 10A).

Case B: When the MME does not Allow Disaster Roaming of the Terminal (when the Access Request of the Terminal is Rejected)

If the MME does not allow disaster roaming of the terminal, even if the MME sends an SMS or MMS to the terminal, the SMS or MMS can only perform a role of an information guide message, thus description of the operation in this case is omitted.

Figure 20A:
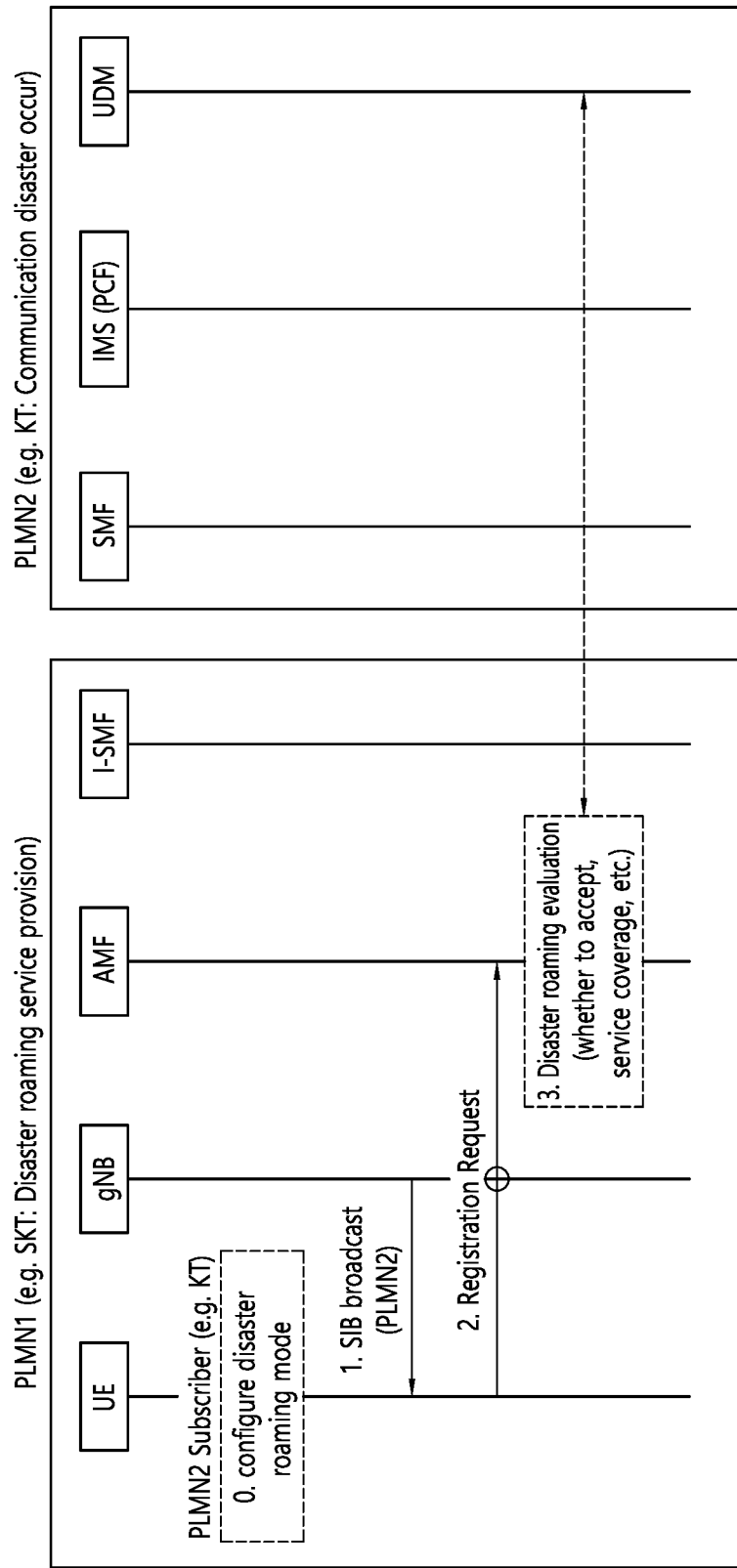
FIGS. 20A and 20B show an embodiment in which a third example of the disclosure of the present specification is applied to 5GS.
Figure 20B:
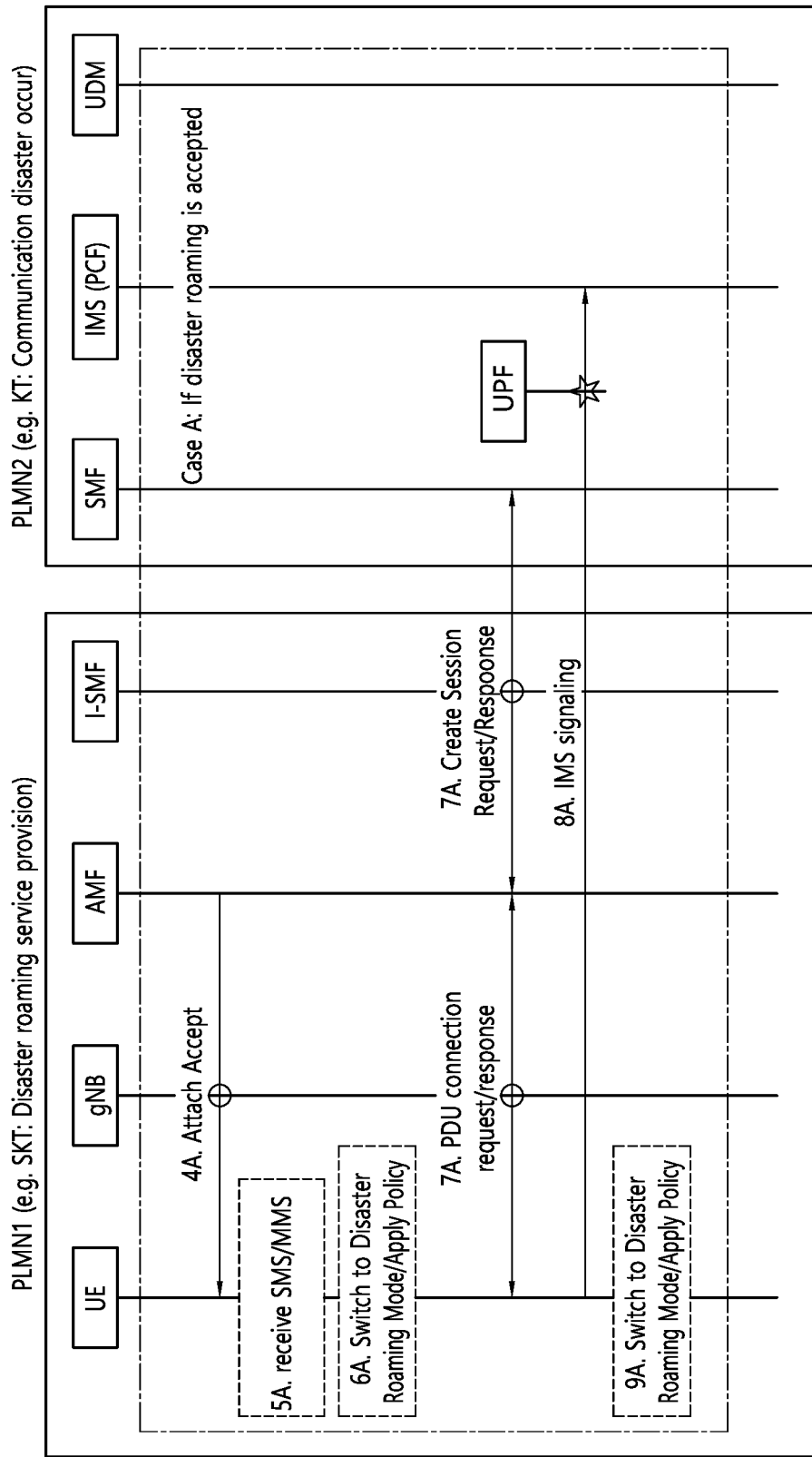

FIGS. 20A and 20B show an embodiment in which a third example of the disclosure of the present specification is applied to 5GS.

0) The terminal may configure the disaster roaming mode by user interaction or operator configuration. Specifically, when the terminal receives disaster roaming information from the network later, the terminal can be configured whether to operate in the disaster roaming mode or not by user interaction or operator configuration. For example, the disaster roaming mode setting of step 0) is a setting for whether to operate in the disaster roaming mode when a disaster roaming message is received from the network later, and is independent of whether the terminal supports the disaster roaming function, that is, it means that even a terminal supporting a roaming function may perform a different operation (eg, not operating in a disaster roaming mode) according to the settings of the user or operator.

1) The base station in the first PLMN may broadcast the information of the second PLMN by temporarily including the information of the second PLMN in the SIB message based on at least one of a preset policy or an operator command (OAM command) Upon receiving the SIB message including the information of the second PLMN, the terminal may recognize the base station in the first PLMN as the base station of the second PLMN and perform an operation of attempting to access the second PLMN. The SIB message may additionally include, directly or indirectly, information indicating a disaster roaming (network failure) situation.

2) The terminal may transmit an access request message to attempt access to the second PLMN. Here, the access request message may be an registration request message. The access request message transmitted by the terminal is physically transmitted to the AMF in the first PLMN through the base station in the first PLMN.

3) The AMF in the first PLMN may determine whether to allow disaster roaming. The AMF may perform an interaction with the UDM in the second PLMN to check subscriber information of the terminal that has transmitted the access request message. The AMF may check a set operator policy or a preset operator policy and preset roaming policy. If necessary, the AMF may perform interconnection with other network nodes, such as PCF, to check the operator policy.

Through this process, the AMF may determine whether or not to allow disaster roaming of the terminal that has transmitted the access request message (eg, whether to accept access to provide disaster roaming service to the terminal) and may determine the scope of the disaster roaming service if disaster roaming is allowed. Here, the scope of the disaster roaming service may be, for example, a basic voice call and a specific service.

According to the determination result of the AMF in the first PLMN, the case A operation or the case B operation may be performed.

Case A: When the AMF Allows Disaster Roaming of the Terminal (when the Access Request of the Terminal is Accepted)

4A) The AMF in the first PLMN may transmit an access acceptance message to the terminal. The connection accept message may be a registration accept message. The access acceptance message may include information on disaster roaming directly or implicitly. Here, information on disaster roaming may be included in the access acceptance message in the form of a NAS message.

Upon receiving the access acceptance message, the terminal may display information on disaster roaming to the user. For example, the terminal may display information on disaster roaming on the display unit of the terminal in a form or method recognizable by the user. Alternatively, the terminal may inform the user of information on disaster roaming using vibration or sound.

5A) The terminal may receive an SMS or MMS message including information on disaster roaming Here, the SMS or MMS message may be transmitted from the AMF.

The terminal may initiate a procedure for configuring (establishing) an additional PDN connection without user interaction based on previously set information on disaster roaming Here, the additional PDN connection may be used for the terminal to be connected to a specific server in case of a disaster to receive disaster-related guidance information from the specific server. Alternatively, the terminal may initiate a procedure for configuring (establishing) an additional PDN connection by user interaction. Here, the additional PDN connection may be established to connect to a server used only in case of a disaster, rather than an internet PDN used by the terminal for general communication purposes.

6A) The terminal may switch the operation mode to the disaster roaming mode based on information on disaster roaming included in SMS or MMS. The terminal may start applying a preset disaster roaming policy based on information on disaster roaming.

7A) If the SMS or MMS includes information on a server inducing access in case of a disaster, the terminal may perform a procedure for configuring (establishing) a PDU session.

The AMF in the first PLMN may communicate with the SMF (intermediate SMF (I-SMF) in FIGS. 20A and 20B) in the first PLMN, and the SMF in the first PLMN may communicate with the SMF in the second PLMN. That is, the SMF in the first PLMN may transmit and receive messages for communicating with the SMF in the second PLMN. The SMF in the first PLMN may perform the role of the I-SMF.

Alternatively, unlike shown, according to the disaster roaming deployment option, the AMF in the first PLMN may perform direct communication with the SMF in the second PLMN, which is the home PLMN of the terminal, and may transmit and receive messages with the SMF in the second PLMN.

Upon receiving the PDU session establishment request message, the SMF in the second PLMN may transmit the PDU session establishment response message to the terminal through the AMF of the first PLMN and the base station in the first PLMN.

8A) The UE may transmit IMS signaling to the IMS network (eg, PCF) in the second PLMN through the PDU session configured (established) in step 7A). Then, the terminal may be provided with an IMS-related service such as a voice service through IMS signaling. Specifically, the IMS signaling of the terminal may be transmitted to the IMS network in the second PLMN through the base station in the first PLMN, the UPF in the first PLMN (not shown in FIGS. 20A and 20B), and the UPF in the second PLMN. In other words, the UE may perform IMS signaling with the IMS network in the second PLMN.

9A) After receiving the response message to the PDU session request message, the UE may switch the operation mode to the disaster roaming mode and apply the disaster roaming policy. The terminal may start applying a preset disaster roaming policy based on information on disaster roaming. For reference, the disaster roaming mode switching and application of the disaster roaming policy may be performed in step 6A) or step 9A).

Case B: When the AMF does not Allow the Terminal's Disaster Roaming (when the Terminal's Access Request is Rejected)

If the AMF does not allow disaster roaming of the terminal, even if the AMF sends an SMS or MMS to the terminal, the SMS or MMS can only perform a role of an information guide message, thus in the embodiment of FIGS. 19A and 19B, a description of the operation in the case of failure is omitted.

The contents described so far may be implemented in hardware. Specifically, the contents described so far may be applied to the hardware to be described with reference to FIGS. 21 to 25.

General Examples to which the Disclosure of the Present Specification can be Applied Some of the disclosures of the present specification as described above are summarized as follows.

According to one disclosure of the present specification, there is provided a method performed by a network node for managing mobility in a first Public Land Mobile Network (PLMN). The network node requests a terminal access from a base station in the first PLMN. message can be received. The terminal may be a terminal subscribed to the second PLMN. Based on the failure of the second PLMN, the network node may determine whether to allow the terminal to roam to the first PLMN.

Based on the determination, the network node may transmit a response message to the access request message to the terminal through the base station in the first PLMN. The response message may include information notifying that a failure has occurred in the second PLMN.

The response message may include a NAS message delivered to a NAS (Non Access Stratum) of the terminal. The NAS message may include information notifying that a failure has occurred in the second PLMN.

The network node may communicate with a network managing subscriber information of the second PLMN to check subscriber information of the terminal. Whether the network node allows roaming of the terminal to the first PLMN based on at least one of the identified subscriber information, an operator policy associated with a failure of the second PLMN, or a roaming policy associated with a failure of the second PLMN can decide When it is determined that the network node allows the terminal to roam to the first PLMN, the first PLMN may determine a range of services to be provided to the terminal.

When it is determined to allow roaming of the terminal to the first PLMN, the response message is an access acceptance message, and the access acceptance message may include information about a service that the terminal can use in the first PLMN.

When it is determined that the terminal rejects roaming to the first PLMN, if the response message is an access rejection message, the access rejection message may be used for the terminal to manage the priority of the PLMN.

The access request message may be received by the network node through the base station of the first PLMN instead of the base station in the second PLMN due to the failure of the second PLMN.

The network node may be a Mobility Management Entity (MME), the access request message may be an attach request message, and the response message may be an attach accept message or an attach reject message.

The network node may be an Access and Mobility Management Function (AMF), the access request message may be a registration request message, and the response message may be a registration acceptance message or a registration rejection message.

Hereinafter, an apparatus to which the above disclosure of the present specification can be applied will be described.

Figure 21:
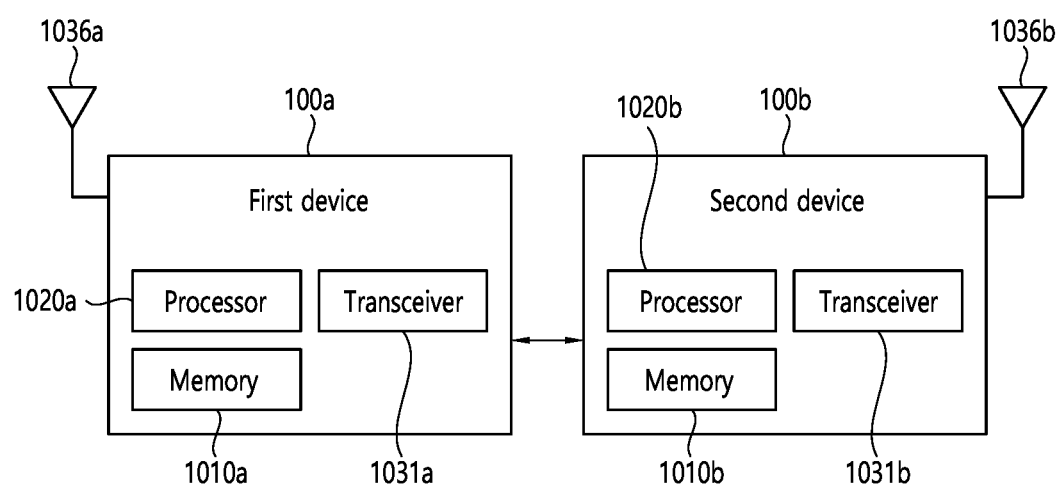
FIG. 21 illustrates a wireless communication system according to an embodiment.

FIG. 21 illustrates a wireless communication system according to an embodiment.

Referring to FIG. 21, the wireless communication system may include a first device 100*a* and a second device 100*b*.

The first device 100*a* may be a device related to a base station, a network node, a transmission terminal, a reception terminal, a wireless device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a personal digital assistants (PDA), a portable multimedia player (PMP), a navigation, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 22:
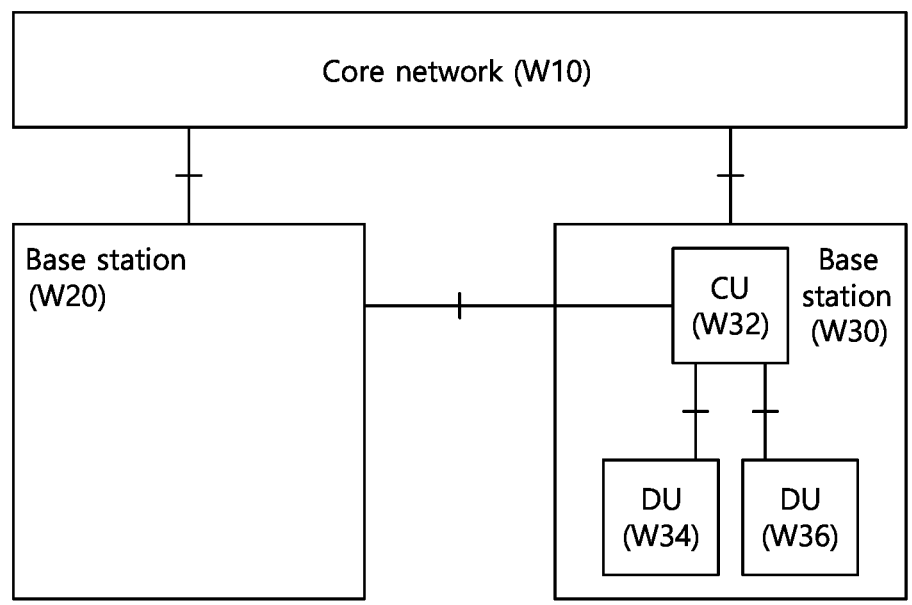
FIG. 22 illustrates a block diagram of a network node according to an embodiment.

FIG. 22 illustrates a block diagram of a network node according to an embodiment.

In particular, FIG. 22 is a diagram more specifically illustrating a case that a base station is divided into a central unit (CU) and a distributed unit (DU).

Referring to FIG. 22, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts radio resource control (RRC), service data adaptation protocol (SDAP) and packet data convergence protocol (PDCP) layers of the base station (e.g., gNB). The DU W34, W36 may be a logical node that hosts radio link control (RLC), media access control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 23:
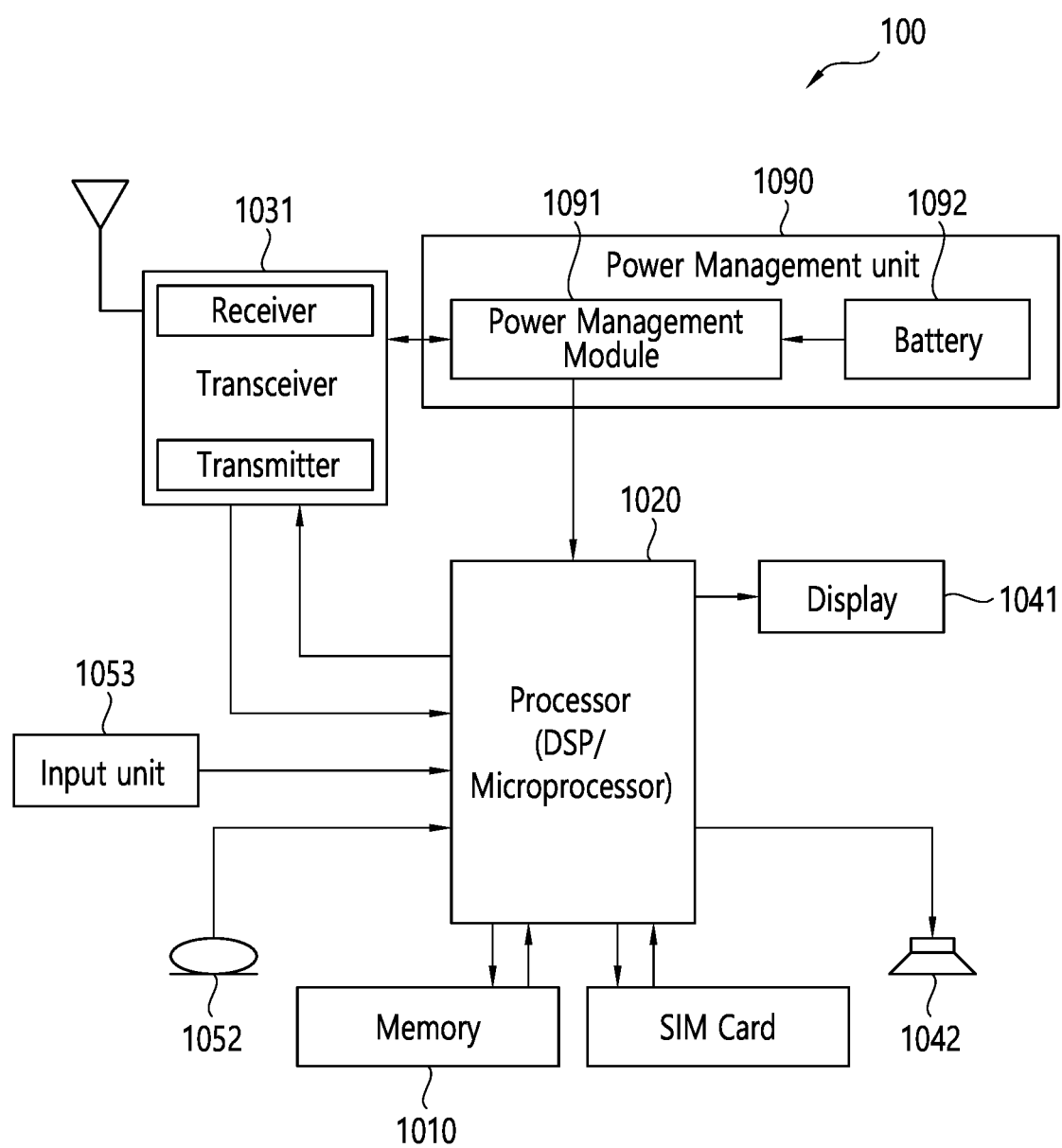
FIG. 23 is a block diagram of a UE according to an embodiment of the present disclosure.

FIG. 23 is a block diagram of a UE according to an embodiment of the present disclosure.

In particular, FIG. 23 is a diagram illustrating the terminal of FIG. 21 in more detail above.

A UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Scenarios to which the Disclosure of the Present Disclosure is Applicable

Hereinafter, scenarios to which the present disclosure is applicable are described.

In the present disclosure, an always-on PDU session for URLLC having a low-latency characteristic may be used for artificial intelligence, robots, autonomous driving, extended reality, and the like among the 5G scenarios below.

Figure 24:
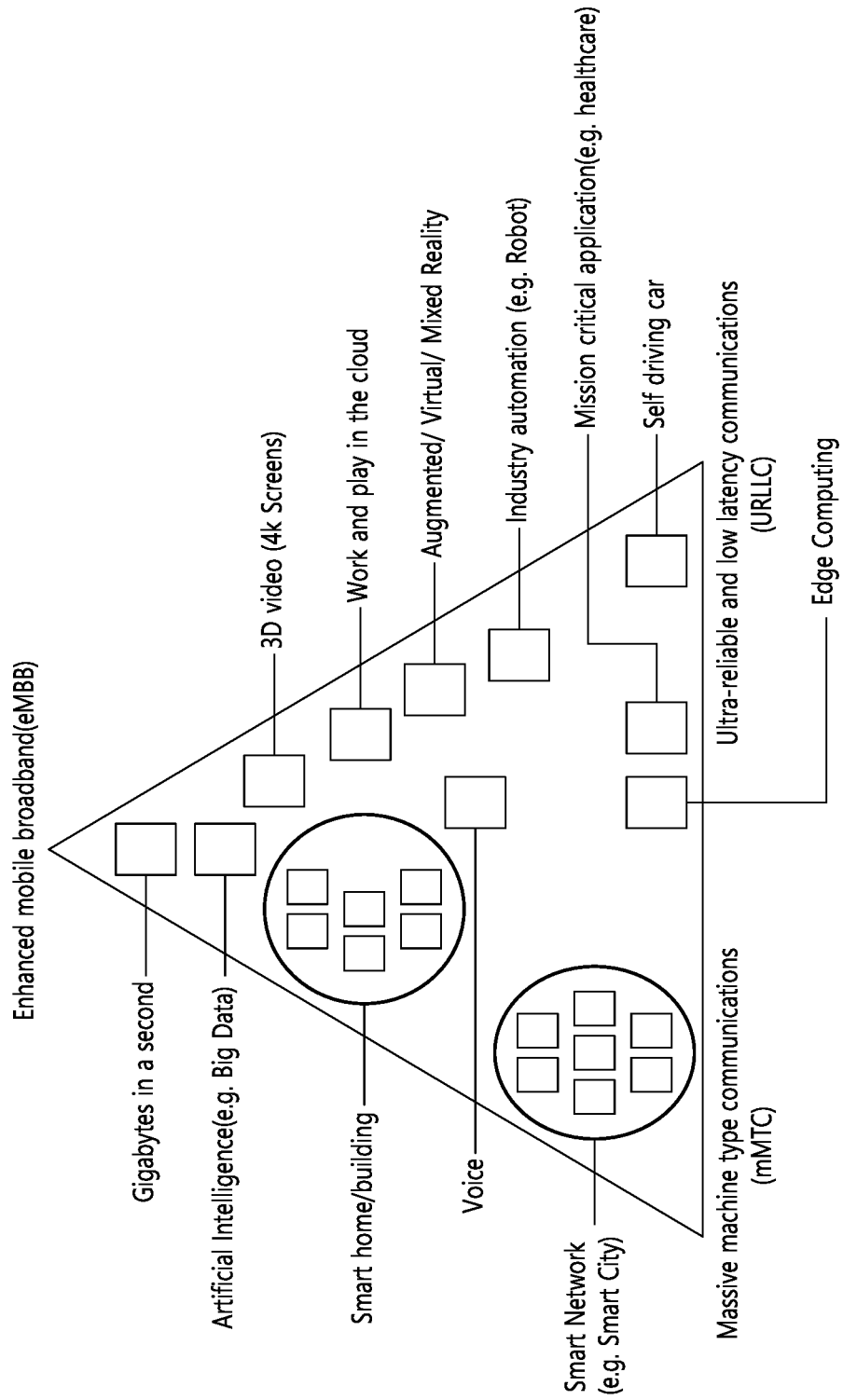
FIG. 24 illustrates an example of 5G use scenarios.

FIG. 24 illustrates an example of 5G use scenarios.

The 5G usage scenarios illustrated in FIG. 24 are merely exemplary, and the technical features of the present disclosure may also be applied to other 5G usage scenarios that are not illustrated in FIG. 24.

Referring to FIG. 24, three major requirement areas of 5G include: (1) an enhanced mobile broadband (eMBB) area, (2) a massive machine type communication (mMTC) area, and (3) an ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are another key factor requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per km2. The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 24 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver TVs with resolution of 4K or higher (6K, 8K and higher) as well as virtual reality (VR) and augmented reality (AR). VR and AR applications involve almost immersive sports events. Specific applications may require special network configuration. For example, in the case of VR games, a game company may need to integrate a core server with an edge network server of a network operator to minimize latency.

Automotive is expected to be an important new driver for 5G together with many use cases for mobile communication regarding vehicles. For example, entertainment for passengers require both high capacity and high mobile broadband. The reason is because future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

The artificial neural network may include an input layer, an output layer, and optionally one or more hidden layers. Each layer includes one or more neurons, and the artificial neural network may include neurons and synapses connecting neurons. In the artificial neural network, each neuron may output a function value of an activation function for input signals, weights, and biases input through synapses.

Model parameters refer to parameters determined through learning, and include the weight of synaptic connections and the bias of neurons. In addition, the hyperparameter refers to a parameter that must be set before learning in a machine learning algorithm, and includes a learning rate, the number of iterations, a mini-batch size, an initialization function, and the like.

The purpose of learning artificial neural networks can be seen as determining the model parameters that minimize the loss function. The loss function may be used as an index for determining optimal model parameters in the learning process of the artificial neural network.

Machine learning can be classified into supervised learning, unsupervised learning, and reinforcement learning according to a learning method.

Supervised learning refers to a method of training an artificial neural network in a state where a label for the learning data is given, and the label may mean the correct answer (or result value) that the artificial neural network must infer when the learning data is input to the artificial neural network. Unsupervised learning may refer to a method of training an artificial neural network in a state where no labels are given for training data. Reinforcement learning can refer to a learning method in which an agent defined in an environment learns to select an action or sequence of actions that maximizes the cumulative reward in each state.

Among artificial neural networks, machine learning implemented as a deep neural network (DNN) including a plurality of hidden layers is also called deep learning, and deep learning is a part of machine learning. Hereinafter, machine learning is used in a sense including deep learning.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to virtual reality (VR), augmented reality (AR), and mixed reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

Figure 25:
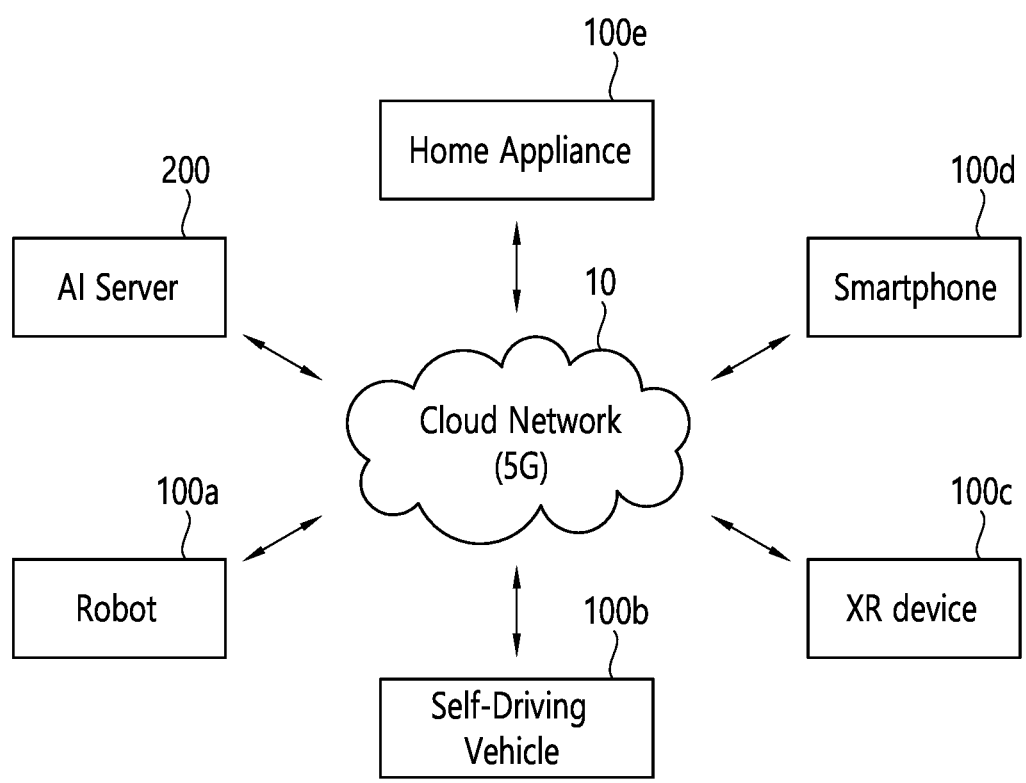
FIG. 25 shows an AI system 1 according to an embodiment.

FIG. 25 shows an AI system 1 according to an embodiment.

Referring to FIG. 25, an AI system 1 is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may be a network that constitutes a part of a cloud computing infrastructure or a network that exists in the cloud computing infrastructure. Here, the cloud network 10 may be configured using a 3G network, a 4G or long term evolution (LTE) network, or a 5G network.

The devices 100a to 100e and 200 configuring the AI system 1 may be interconnected over the cloud network. Particularly, the devices 100a to 100e and 200 may communicate with each other through a base station but may directly communicate with each other without the intervention of a base station.

The AI server 200 may include a server that performs AI processing and a server that performs an operation on big data.

The AI server 200 is connected to at least one of the robot 100a, the self-driving vehicle 100b, the XR device 100c, the smartphone 100d or the home appliances 100e, that is, AI devices configuring the AI system, over the cloud network 10 and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

Hereinafter, various embodiments of the AI devices 100a to 100e to which the aforementioned technology is applied will be described.

<AI+Robot>

The robot 100a, which adopts an AI technology, may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implemented with hardware.

The robot 100a may acquire status information of the robot 100a using sensor information acquired from various types of sensors, detect (recognize) surrounding environments and objects, generate map data, determine moving routes and driving plans, determine responses to user interactions, or determine actions.

Here, the robot 100a may use sensor information obtained from at least one sensor from among lidar, radar, and camera to determine a moving route and a driving plan.

The robot 100a may perform the above operations using a learning model including at least one artificial neural network. For example, the robot 100a may recognize a surrounding environment and an object using a learning model and may determine an operation using the recognized surrounding environment information or object information. Here, the learning model may be directly learned by the robot 100a or learned by an external device such as the AI server 200.

Here, the robot 100a may directly generate a result using a learning model and perform an operation, or transmit sensor information to an external device such as the AI server 200, receive a result generated accordingly, and perform an operation.

The robot 100a may determine a moving path and a driving plan using at least one of map data, object information detected from sensor information, or object information acquired from an external device, and control a driving unit to drive the robot 100a according to the moving path and the driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, a type, a distance, and a location.

In addition, the robot 100a may perform an operation or run by controlling the driving unit based on the user's control/interaction. In this case, the robot 100a may acquire interaction intention information according to a user's motion or voice speech, determine a response based on the acquired intention information, and perform an operation.

<AI+Autonomous-Driving/Self-Driving>

The autonomous vehicle 100b may be implemented as a mobile robot, a vehicle, an unmanned aerial vehicle, etc., to which AI technology is applied.

The autonomous vehicle 100b may include an autonomous driving control module for controlling the autonomous driving function, and the autonomous driving control module may refer to a software module and/or a chip implementing the software module. The autonomous driving control module may be included in the autonomous vehicle 100b as a component of the autonomous vehicle 100b, but may be connected to the outside of the autonomous vehicle 100b with separate hardware.

The autonomous vehicle 100b may acquire the state information of the autonomous vehicle 100b using the sensor information acquired from various kinds of sensors and/or detect (recognize) the surrounding environment and/or the object, and/or generate map data, and/or determine a travel route and/or a travel plan, and/or determine an operation.

Like the robot 100a, the autonomous vehicle 100b can use the sensor information acquired from at least one sensor among the LIDAR, the radar, and/or the camera to determine the travel route and/or the travel plan.

In particular, the autonomous vehicle 100b can recognize an environment and/or an object for an area in which the field of view is obscured and/or over a certain distance by receiving sensor information from external devices, and/or receive the recognized information directly from external devices.

The autonomous vehicle 100b can perform the above-described operations using a learning model composed of at least one ANN. For example, the autonomous vehicle 100b can recognize the surrounding environment and/or the object using the learning model, and can determine the travel route using the recognized surrounding information and/or the object information. The learning model may be learned directly from the autonomous vehicle 100b and/or learned from an external device such as the AI server 200.

In this case, the autonomous vehicle 100b may perform an operation by generating a result using a direct learning model, but the autonomous vehicle may also perform operation by transmitting sensor information to an external device such as the AI server 200 and receiving the generated result.

The autonomous vehicle 100b may determine the travel route and/or the travel plan using at least one of the map data, the object information detected from the sensor information and/or the object information acquired from the external device, and drive the autonomous vehicle 100b according to the determined travel route and/or travel plan by controlling the driving unit.

The map data may include object identification information on various objects arranged in a space (e.g. road) in which the autonomous vehicle 100b moves. For example, the map data may include object identification information on fixed objects such as street lamps, rocks, and buildings, and/or on movable objects such as vehicles and pedestrians. The object identification information may include a name, a type, a distance, and/or a position, etc.

Also, the autonomous vehicle 100b may perform the operation and/or run by controlling the driving unit based on the control/interaction of the user. The autonomous vehicle 100b may acquire the intention information of the interaction due to the user's operation and/or voice utterance, determine the response based on the acquired intention information, and perform the operation.

<AI+XR>

The XR device 100c may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100c analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100c may output an XR object, which includes the additional information about the recognized object, by corresponding to the recognized object.

The XR device 100c can perform the above-described operations using a learning model composed of at least one ANN. For example, the XR device 100*c* can recognize a real object from three-dimensional point cloud data and/or image data using the learning model, and can provide information corresponding to the recognized real object. The learning model may be learned directly from the XR device 100*c* and/or learned from an external device such as the AI server 1200.

In this case, the XR device 100*c* may perform an operation by generating a result using a direct learning model, but the autonomous vehicle may also perform operation by transmitting sensor information to an external device such as the AI server 200 and receiving the generated result.

<AI+Robot+Autonomous-Driving/Self-Driving>

The robot 100*a* may be implemented as a guide robot, a carrying robot, a cleaning robot, a wearable robot, an entertainment robot, a pet robot, an unmanned flying robot, etc., to which AI technology and autonomous-driving technology are applied.

The robot 100*a*, to which the AI technology and the autonomous-driving technology are applied, may mean the robot 100*a* having the autonomous-driving function itself and/or the robot 100*a* interacting with the autonomous vehicle 100*b*.

The robot 100*a* having an autonomous-driving function can collectively refer to devices that move by themselves in accordance with a given travel route and/or move by determining the traveling route by themselves without user's control.

The robot 100*a* having the autonomous-driving function and the autonomous vehicle 100*b* can use a common sensing method to determine at least one of the travel route and/or the travel plan. For example, the robot 100*a* having the autonomous-driving function and the autonomous vehicle 100*b* can determine at least one of the travel route and/or the travel plan using the information sensed through the LIDAR, the radar, and/or the camera.

The robot 100*a* interacting with the autonomous vehicle 100*b* may exist separately from the autonomous vehicle 100*b*, and the robot 100*a* interacting with the autonomous vehicle 100*b* may be associated with the autonomous-driving function inside and/or outside the autonomous vehicle 100, and/or may perform an operation associated with the user aboard the autonomous vehicle 100*b*.

The robot 100*a* interacting with the autonomous vehicle 100*b* may acquire the sensor information on behalf of the autonomous vehicle 100*b* and provide it to the autonomous vehicle 100*b*, or the robot 100*a* interacting with the autonomous vehicle 100*b* may obtain the sensor information and generate the environment information and/or the object information to provide the autonomous vehicle 100*b*, thereby controlling and/or assisting the autonomous-driving function of the autonomous vehicle 100*b*.

Or, the robot 100*a* interacting with the autonomous vehicle 100*b* may monitor the user boarding the autonomous vehicle 100*b* and/or may control the functions of the autonomous vehicle 100*b* through interaction with the user. For example, when it is determined that the driver is in a drowsy state, the robot 100*a* may activate the autonomous-driving function of the autonomous vehicle 100*b* and/or assist the control of the driving unit of the autonomous vehicle 100*b*. The function of the autonomous vehicle 100*b* controlled by the robot 100*a* may include not only an autonomous-driving function but also a function provided by a navigation system and/or an audio system provided in the autonomous vehicle 100*b*.

Or, the robot 100*a* interacting with the autonomous vehicle 100*b* may provide information and/or assist the function to the autonomous vehicle 100*b* outside the autonomous vehicle 100*b*. For example, the robot 100*a*, such as a smart traffic light, may provide traffic information including signal information, etc., to the autonomous vehicle 100*b*. The robot 100*a*, such as an automatic electric charger of an electric vehicle, may interact with the autonomous vehicle 100*b* to connect the electric charger to the charging hole automatically.

<AI+Robot+XR>

The robot 100*a* may be implemented as a guide robot, a carrying robot, a cleaning robot, a wearable robot, an entertainment robot, a pet robot, an unmanned flying robot, a drone, etc., to which AI technology and XR technology are applied.

The robot 100*a* to which the XR technology is applied may refer to a robot that is subject to control/interaction in the XR image. In this case, the robot 100*a* may be separated from the XR device 100*c* and can be associated with each other.

When the robot 100*a* that is the subject to control/interaction in the XR image acquires the sensor information from the sensors including the camera, the robot 100*a* and/or the XR device 100*c* may generate an XR image based on the sensor information and the XR device 100*c* can output the generated XR image. The robot 100*a* can operate based on a control signal and/or a user's interaction input through the XR device 100*c*.

For example, the user can acknowledge the XR image corresponding to the viewpoint of the robot 100*a* remotely linked through the external device such as the XR device 100*c*, and can adjust the autonomous travel path of the robot 100*a*, control operation and/or driving, or check the information of neighboring objects, through interaction.

<AI+Autonomous-Driving/Self-Driving+XR>

The autonomous vehicle 100*b* may be implemented as a mobile robot, a vehicle, an unmanned aerial vehicle, etc., to which AI technology and XR technology are applied.

The autonomous driving vehicle 100*b* to which the XR technology is applied may mean an autonomous vehicle having means for providing an XR image and/or an autonomous vehicle that is subject to control/interaction in the XR image. Particularly, the autonomous vehicle 100*b* that is subject to control/interaction in the XR image may be separated from the XR device 100*c* and can be associated with each other.

The autonomous vehicle 100*b* having the means for providing the XR image can acquire the sensor information from the sensors including the camera and output the generated XR image based on the acquired sensor information. For example, the autonomous vehicle 100*b* may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 100*b*, at least a part of the XR object may be output so as to overlap with the object in the screen. For example, the autonomous vehicle 100*b* can output XR objects corresponding to objects such as a lane, another vehicle, a traffic light, a traffic sign, a two-wheeled vehicle, a pedestrian, a building, etc.

When the autonomous vehicle 100*b* that is the subject to control/interaction in the XR image acquires the sensor information from the sensors including the camera, the autonomous vehicle 100*b* and/or the XR device 100*c* may generate an XR image based on the sensor information and the XR device 100c can output the generated XR image. The autonomous vehicle 100b can operate based on a control signal and/or a user's interaction input through the XR device 100c.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, however, the present specification is not limited to the order of the steps, and some steps may occur in a different order or concurrently with other steps as described above. In addition, those skilled in the art will understand that the steps shown in the flowchart are not exhaustive and that other steps may be included or that one or more steps of the flowchart may be deleted without affecting the scope of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method performed by a network node managing mobility in a first Public Land Mobile Network (PLMN), the method comprising:
   receiving, by the network node, an access request message of a terminal from a base station in the first PLMN,
     wherein the terminal is a terminal subscribed to a second PLMN,
     wherein the access request message is transmitted by the terminal, based on information related to the second PLMN which was transmitted by the base station in the first PLMN, and
     wherein the access request message is transmitted by the terminal in order to access the second PLMN;
   determining, by the network node, to allow the terminal to roam to the first PLMN, based on an occurrence of a failure in the second PLMN; and
   based on the determination, transmitting, by the network node, an accept message to the access request message to the terminal through a base station in the first PLMN,
     wherein the accept message includes information indicating that a failure has occurred in the second PLMN.

2. The method of claim 1,
   wherein the accept message includes a Non Access Stratum (NAS) message delivered to a NAS of the terminal, and
   wherein the NAS message includes the information indicating that a failure has occurred in the second PLMN.

3. The method of claim 1,
   wherein the determining to allow the terminal to roam to the first PLMN includes:
   checking subscriber information of the terminal by communicating with a network managing subscriber information of a second PLMN; and
   determining whether to allow roaming of the terminal to the first PLMN, based on at least one of the identified subscriber information, an operator policy associated with a failure of the second PLMN, or a roaming policy associated with a failure of the second PLMN.

4. The method of claim 1, further comprising:
   when roaming of the terminal to the first PLMN is determined to be allowed, determining a range of a service to be provided to the terminal in the first PLMN.

5. The method of claim 1,
   wherein the accept message includes information about the service that the terminal can use in the first PLMN.

6. The method of claim 1, wherein the access request message is received by the network node through the base station of the first PLMN instead of the base station in the second PLMN due to a failure of the second PLMN.

7. The method of claim 1,
   wherein the network node is a Mobility Management Entity (MME),
   wherein the access request message is an attach request message, and
   wherein the accept message is an attach accept message.

8. The method of claim 1,
   wherein the network node is an Access and Mobility Management Function (AMF),
   wherein the access request message is a registration request message, and
   wherein the accept message is a registration accept message.

9. A network node managing mobility in a first Public Land Mobile Network (PLMN), the network node comprising:
   a transceiver; and
   a processor controlling the transceiver,
   wherein the processor is configured to:
   control the transceiver to receive an access request message of a terminal from a base station in the first PLMN,
     wherein the terminal is a terminal subscribed to a second PLMN,
     wherein the access request message is transmitted by the terminal, based on information related to the second PLMN which was transmitted by the base station in the first PLMN, and
     wherein the access request message is transmitted by the terminal in order to access the second PLMN;
   determine to allow the terminal to roam to the first PLMN, based on an occurrence of a failure in the second PLMN; and
   based on the determination, transmit an accept message to the access request message to the terminal through a base station in the first PLMN,
   wherein the accept message includes information indicating that a failure has occurred in the second PLMN.

10. The network node of claim 9,
    wherein the accept message includes a Non Access Stratum (NAS) message delivered to a NAS of the terminal, and
    wherein the NAS message includes the information indicating that a failure has occurred in the second PLMN.

11. The network node of claim 9,
    wherein determining to allow the terminal to roam to the first PLMN includes:
    checking subscriber information of the terminal by communicating with a network managing subscriber information of a second PLMN; and
    determining whether to allow roaming of the terminal to the first PLMN, based on at least one of the identified subscriber information, an operator policy associated with a failure of the second PLMN, or a roaming policy associated with a failure of the second PLMN.

12. The network node of claim 9, when roaming of the terminal to the first PLMN is determined to be allowed, determining a range of a service to be provided to the terminal in the first PLMN.

13. The network node of claim 9,
when roaming of the terminal to the first PLMN is determined to be allowed, the accept message is an access accept message,
wherein the access accept message includes information about the service that the terminal can use in the first PLMN.

14. The network node of claim 9, wherein the access request message is received by the network node through the base station of the first PLMN instead of the base station in the second PLMN due to the failure of the second PLMN.

15. The network node of claim 9,
wherein the network node is a Mobility Management Entity (MME),
wherein the access request message is an attach request message, and
wherein the response message is an attach accept message or an attach reject message.

16. The network node of claim 9,
wherein the network node is an Access and Mobility Management Function (AMF),
wherein he access request message is a registration request message, and
wherein the response message is a registration acceptance message or a registration rejection message.

* * * * *